US012260157B1

(12) United States Patent
Satzinger et al.

(10) Patent No.: US 12,260,157 B1
(45) Date of Patent: Mar. 25, 2025

(54) QUBIT-COUPLER-QUBIT MODEL FOR SYSTEM CALIBRATION

(71) Applicant: Google LLC, Mountain View, CA (US)

(72) Inventors: Kevin Joseph Satzinger, Goleta, CA (US); Andrew Lorne Dunsworth, Goleta, CA (US); Kostyantyn Yevgenovych Kechedzhi, Santa Monica, CA (US); Julian Shaw Kelly, Santa Barbara, CA (US); Charles James Neill, Goleta, CA (US); Pedram Roushan, Santa Barbara, CA (US)

(73) Assignee: GOOGLE LLC, Mountain View, CA (US)

( * ) Notice: Subject to any disclaimer, the term of this patent is extended or adjusted under 35 U.S.C. 154(b) by 340 days.

(21) Appl. No.: 17/109,455

(22) Filed: Dec. 2, 2020

Related U.S. Application Data

(60) Provisional application No. 62/943,138, filed on Dec. 3, 2019.

(51) Int. Cl.
  *G06F 30/20* (2020.01)
  *G06N 10/00* (2022.01)
  *G06F 111/10* (2020.01)

(52) U.S. Cl.
  CPC ............ *G06F 30/20* (2020.01); *G06N 10/00* (2019.01); *G06F 2111/10* (2020.01)

(58) Field of Classification Search
  CPC ...... G06F 30/20; G06F 2111/10; G06N 10/00
  See application file for complete search history.

(56) References Cited

U.S. PATENT DOCUMENTS

2017/0116542 A1* 4/2017 Shim ...................... G06N 10/00
2018/0260729 A1* 9/2018 Abdo ..................... G06N 99/00
2018/0260732 A1* 9/2018 Bloom ................... G06N 10/00

OTHER PUBLICATIONS

Dunsworth, Andrew. "High fidelity entangling gates in superconducting qubits." PhD diss., University of California, Santa Barbara, 2018. (Year: 2018).*

* cited by examiner

*Primary Examiner* — Chuen-Meei Gan
(74) *Attorney, Agent, or Firm* — DORITY & MANNING P.A.

(57) ABSTRACT

Systems and methods for calibrating and initializing a system comprising a first qubit, a second qubit, and a coupler are provided. A method of initializing the system can include calibrating the system; providing a first idle resonance frequency of the first qubit and a second idle resonance frequency of the second qubit; providing the first bias for the first idle resonance frequency and the second bias for the second idle resonance frequency; determining a value of the third resonance frequency at which a difference between the first degree of coupling and the second degree of coupling is minimized, when the first resonance frequency is the first idle resonance frequency and the second resonance frequency is the second idle resonance frequency; and providing the third bias according to the determined value of the third resonance frequency.

20 Claims, 8 Drawing Sheets

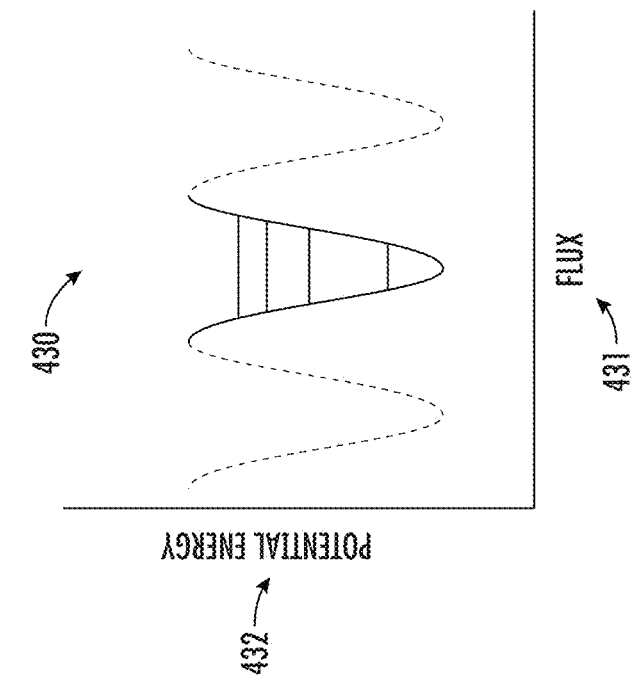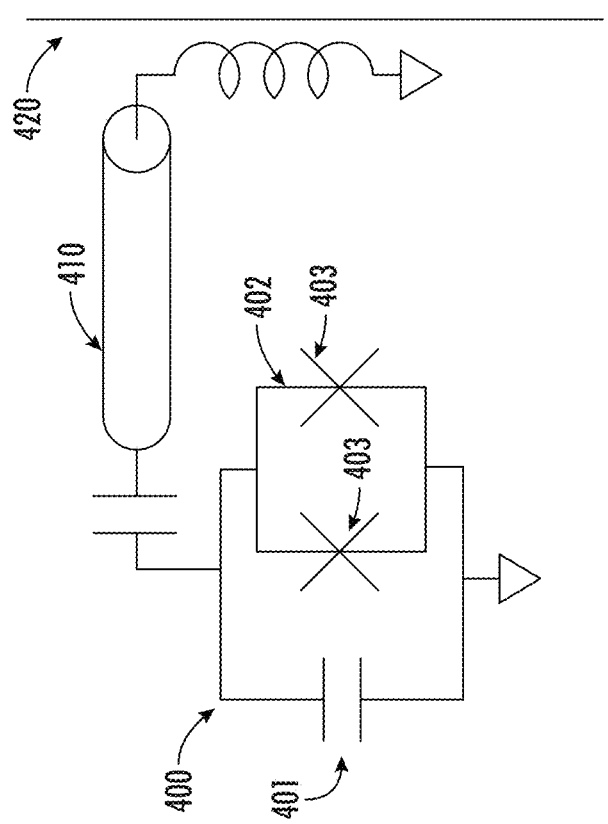
FIG. 4

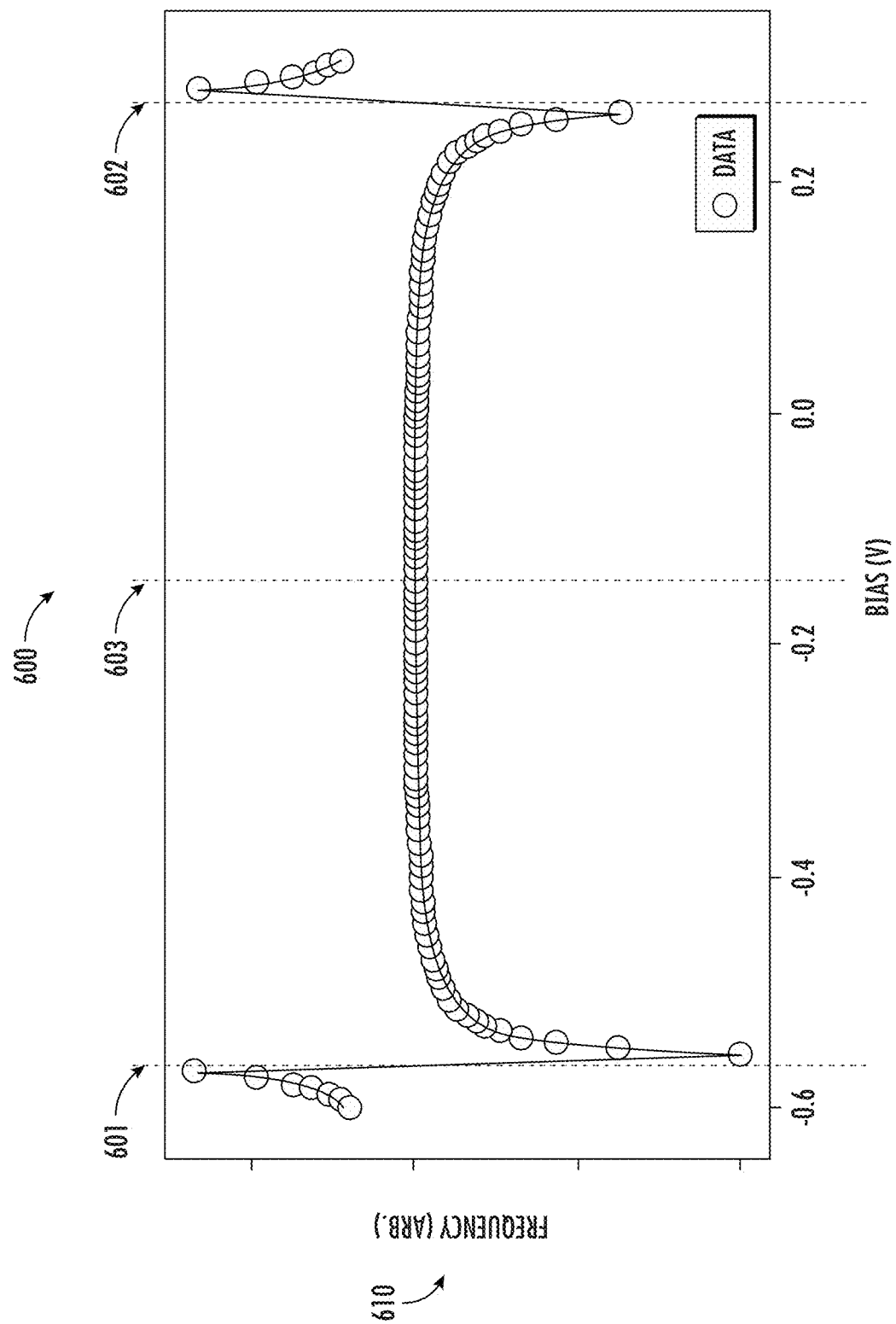

QUBIT-COUPLER-QUBIT MODEL FOR SYSTEM CALIBRATION

PRIORITY CLAIM

The present application claims filing benefit of U.S. Provisional Patent Application Ser. No. 62/943,138 having a filing date of Dec. 3, 2019, which is incorporated herein by reference in its entirety.

FIELD

This present subject matter relates to calibrating a quantum computing system.

BACKGROUND

Large-scale quantum computers have the potential to provide fast solutions to certain classes of difficult problems. Multiple challenges in the design and implementation of quantum architecture to control, program and maintain quantum hardware impede the realization of large-scale quantum computing.

SUMMARY

The present disclosure relates to a method of calibrating a system including two qubits coupled with a coupler and a method of initializing such system such that the coupling between the two qubits are turned off.

In general, an innovative aspect of the subject matter of the present disclosure may be embodied in a method for calibrating a system comprising a first qubit; a second qubit; and a coupler coupled to the first qubit and the second qubit, wherein the coupler configured to mediate a first degree of coupling between the first qubit and the second qubit. The method comprises in the following order: providing a first model for the first qubit and the second qubit, wherein the first model provides a first resonance frequency of the first qubit as a function of a first bias applied to the first qubit and provides a second resonance frequency of the second qubit as a function of a second bias applied to the second qubit; determining a first set of parameters of the first model such that the first model estimates the first resonance frequency in response to the first bias and the second resonance frequency in response to the second bias; providing a second model, wherein the second model provides the first resonance frequency and the second resonance frequency as a function of a third bias applied to the coupler; determining a second set of parameters of the second model such that the second model estimates the first resonance frequency and the second resonance frequency in response to the third bias; providing a third model, wherein the third model provides the first resonance frequency as a function of the second bias; determining a third set of parameters of the third model such that the third model estimates the first resonance frequency in response to the second bias and estimates a second degree of coupling between the first qubit and the second qubit in response to the first bias and the second bias, wherein the second degree of coupling is not mediated by the coupler; and providing a fourth model based on the second set and the third set of parameters, wherein the fourth model describes the system as a function of the first resonance frequency of the first qubit, the second resonance frequency of the second qubit and a third resonance frequency of the coupler.

The foregoing and other implementations can each optionally include one or more of the following features, alone or in combination.

In some implementations, determining the first set of parameters comprises: generating a first data set by measuring the first resonance frequency at a plurality of values of the first bias and by measuring the second resonance frequency at a plurality of values of the second bias; and fitting the first model to the first data set.

In some implementations, determining the second set of parameters comprises: providing the first bias at a first predetermined value and the second bias at a second predetermined value; generating a second data set by measuring the first resonance frequency and the second resonance frequency at a plurality of values of the third bias; and fitting the second model to the second data set to estimate the second set of parameters.

In some implementations, determining the third set of parameters comprises: providing the third bias at a third predetermined value; providing the first bias at a fourth predetermined value; generating a third data set by measuring the first resonance frequency at a plurality of values of the second bias; and fitting the third model to the first data set to estimate the third set of parameters.

In some implementations, the first set of parameters comprises one or more of: a first flux offset of the first qubit, a second flux offset of the second qubit, a first mutual inductance between the first qubit and a first coil for generating the first bias, a second mutual inductance between the second qubit and a second coil for generating the second bias, a first maximum frequency of the first qubit, a second maximum frequency of the second qubit, a first coupling efficiency between the first qubit and a first readout resonator and a second coupling efficiency between the second qubit and a second readout resonator.

In some implementations, the second set of parameters further comprises one or more of: a third flux offset of the coupler, a third maximum frequency of the coupler, and a third mutual inductance between the coupler and a third coil for generating the third bias.

In some implementations, the fourth model comprises a Hamiltonian for a three coupled two-level-systems.

In some implementations, the coupler comprises an LC resonator, and an inductor of the LC resonator comprises a Josephson junction.

In some implementations, the coupler comprises a gmon qubit.

In some implementations, the coupler comprises a transmon qubit.

In some implementations, the second degree of coupling comprises a capacitive coupling between the first qubit and the second qubit.

In some implementations, there is provided a method of initializing a system comprising a first qubit; a second qubit; and a coupler interposed by and coupled to the first qubit and the second qubit, wherein the coupler is configured to control a first degree of coupling between the first qubit and the second qubit. The method comprises: calibrating the system according to any preceding claim; providing a first idle resonance frequency of the first qubit and a second idle resonance frequency of the second qubit; providing the first bias for the first idle resonance frequency and the second bias for the second idle resonance frequency; determining a value of the third resonance frequency at which a difference between the first degree of coupling and the second degree of coupling is minimized, when the first resonance frequency is the first idle resonance frequency and the second resonance frequency is the second idle resonance frequency; and providing the third bias according to the determined value of the third resonance frequency.

In some implementations, the fourth model comprises a Hamiltonian for a three coupled two-level-systems, and the method further comprises: evaluating, based on the second set of parameters, a first coupling coefficient $k_c$, wherein a coupling efficiency between the first qubit and the coupler or between the second qubit and the coupler is $$g_1 = k_c \frac{\sqrt{f\, f_c}}{2}$$

when the first resonance frequency or the second resonance frequency is f, and the third resonance frequency is $f_c$; and evaluating, based on the third set of parameters, a second coupling coefficient $k_q$, wherein the second degree of coupling is $$g_2 = k_q \frac{\sqrt{f_1\, f_2}}{2}$$

when the first resonance frequency is $f_1$ and the second resonance frequency is $f_2$.

In some implementations, determining the value of the third resonance frequency comprises: evaluating, from the Hamiltonian, an even mode eigenfrequency and an odd mode eigenfrequency of the system as a function of the first resonance frequency, the second resonance frequency and the third resonance frequency; and equating the evaluated odd mode eigenfrequency and the evaluated even mode eigenfrequency to deduce the value of the third resonance frequency.

In some implementations, the value of the third resonance frequency is given by $$f_c = \frac{f(2 - k_q)}{2 - k_c^2/k_q}$$

when the first resonance frequency and the second resonance frequency are equal to f.

The foregoing and other implementations can each optionally include one or more of the following features, alone or in combination.

The details of one or more embodiments are set forth in the accompanying drawings and the description below. Other features and advantages will be apparent from the description and drawings, and from the claims.

Aspects and advantages of embodiments of the present disclosure will be set forth in part in the following description, or can be learned from the description, or can be learned through practice of the embodiments.

BRIEF DESCRIPTION OF THE DRAWINGS

Detailed discussion of embodiments directed to one of ordinary skill in the art is set forth in the specification, which makes reference to the appended figures, in which:

FIG. 4 shows a schematic of a frequency tunable transmon qubit and an energy diagram;

FIG. 6 shows the resonance frequency of a transmon qubit as a function of the flux bias applied to the coupler.

DETAILED DESCRIPTION

Quantum computing entails coherently processing quantum information stored in the quantum bits (qubits) of a quantum computer. Superconducting quantum computing is a promising implementation of solid-state quantum computing technology in which quantum information processing systems are formed, in part, from superconducting materials. To operate quantum information processing systems that employ solid-state quantum computing technology, such as superconducting qubits, the systems are maintained at extremely low temperatures, e.g., in the 10s of mK. The extreme cooling of the systems keeps superconducting materials below their critical temperature and helps avoid unwanted state transitions. To maintain such low temperatures, the quantum information processing systems may be operated within a cryostat, such as a dilution refrigerator.

Even at the extremely low qubit operating temperatures, qubits may still suffer from decoherence and gate errors. As such, large-scale quantum error correction algorithms can be deployed to compensate for the gate errors and qubit decoherence. An error-corrected quantum processor leverages redundancy to synthesize protected logical qubits from ensembles of error-prone qubits. Implementations of current superconducting quantum systems therefore may use a large number of qubits to implement error correction algorithms.

As processors scale to more qubits, high-fidelity operation of superconducting qubits requires fine-tuning numerous experimental parameters and this becomes increasingly challenging. In particular, in a square array of qubits, each pair of neighboring qubits can be connected by an adjustable coupler and these couplers can complicate system calibration. The resonance frequencies of the two qubits and the coupler are tunable with biases respectively applied to the qubits and a bias applied to the coupler. For example, it may be difficult to determine coupler bias settings that turn off qubit-qubit interactions due to unwanted qubit-qubit interactions and due to the coupler bias affecting the qubit frequencies.

Conventionally, qubit-coupler systems were calibrated by human experts often iterating back and forth between qubit calibration and changing the coupler bias to try to find parameters where the coupling is off. Therefore, a procedure to reliably find a set of control parameters to turn off the coupling between neighboring qubits may be necessary.

This specification provides such procedure considering a pair of qubits and a coupler that mediates their interactions.

Figure 1:
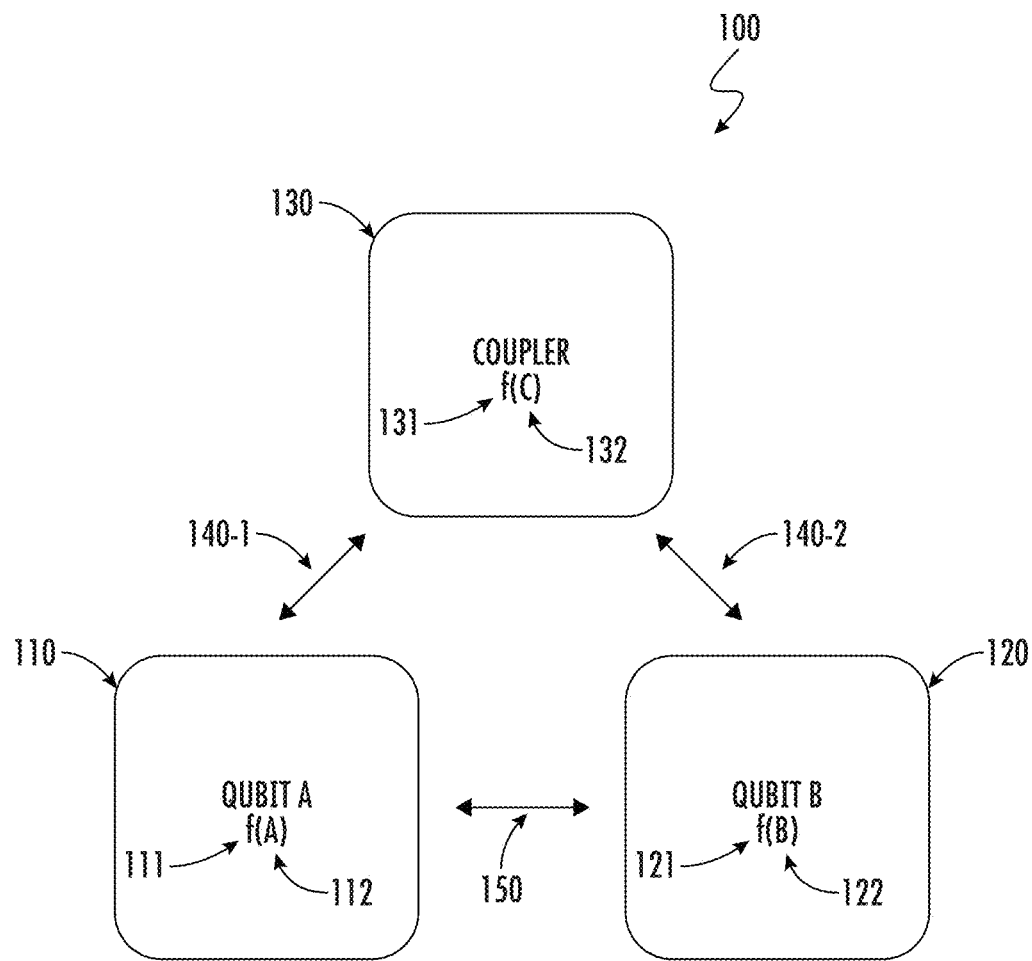
FIG. 1 is a schematic that illustrates a qubit-coupler-qubit system.

FIG. 1 is a schematic that illustrates a qubit-coupler-qubit system

The qubit-coupler-qubit system 100 includes a first qubit 110, a second qubit 120 and a coupler 130. The first qubit 110 is labelled as 'Qubit A' and the second qubit 120 is labelled as 'Qubit B' in FIG. 1.

The first qubit 110 and the second qubit 120 may be any type of qubits, or quantum systems including energy levels which can be approximated as a quantum mechanical 2-level system. The examples of the first qubit 110 and the second qubit 120 include quantum LC oscillators or superconducting qubits such as transmon qubits, fluxmon qubits, charge qubits, or gmon qubits. The examples of the first qubit 110 and the second qubit 120 may also include other solid state systems such as semiconductor quantum dots and diamond NV centers and atomic systems such as trapped ions. However, the examples of the first qubit 110 and the second qubit 120 are not limited to these examples.

In some implementations, the first qubit 110 and the second qubit 120 may be the same type of qubits.

In some implementations, the first qubit 110 and the second qubit 120 may be different types of qubits. For example, when the first qubit 110 and the second qubit 120 are superconducting qubits, but the first qubit 110 may be a transmon qubit and the second qubit 120 may be a flux qubit or a phase qubit.

In some implementations, the qubit-coupler-qubit system 100 may be a part of a larger system containing additional qubits and couplers or a plurality of the qubit-coupler-qubit system 100. For example, the qubit-coupler-qubit system 100 may be a part of a 2-dimensional arrangement of qubits, such as a square grid, where each adjacent pair of qubits is interposed and mediated by the coupler 130. As part of the larger system of qubits and couplers, the first qubit 110 and the second qubit 120 of the qubit-coupler-qubit system 100 may further be connected to other qubits. For example, the first qubit 110 may be coupled to three more qubits in addition to the second qubit 120 via three respective couplers.

The first qubit 110 and the second qubit 120 exhibit at least one resonance frequency arising from the 2-level quantum mechanical transition. The corresponding resonance frequencies will be referred to as a first resonance frequency 111 and a second resonance frequency 121, respectively.

The first qubit 110 is configured such that the first resonance frequency 111 is controlled by providing a first bias 112, labelled as 'A' in FIG. 1. Therefore, the first resonance frequency 111 is modelled to be dependent on the first bias 112 or as a function of the first bias 112 labelled as 'f(A)' in FIG. 1.

The second qubit 120 is configured such that the second resonance frequency 121 is controlled by providing a second bias 122, labelled as 'B' in FIG. 1. Therefore, the second resonance frequency 121 is modelled to be dependent on the second bias 122 or as a function of the second bias 122 labelled as 'f(B)' in FIG. 1.

In some implementations, the first bias 112 and the second bias 122 may be a magnetic flux applied to the first qubit 110 and the second qubit 120, respectively. For example, when the first qubit 110 and the second qubit 120 are superconducting qubits, the first bias 112 and the second bias 122 may be provided by the magnetic flux threaded through the respective SQUID loops of the first qubit 110 and the second qubit 120.

The examples of the first bias 112 and the second bias 122 are not limited to magnetic flux or magnetic field and depend on the specific design or inherent property of the first qubit 110 and the second qubit 120. For example, when the first qubit 110 and the second qubit 120 are superconducting qubits, the first bias 112 and the second bias 122 may be provided by AC signals inductively or capacitively coupled to the first qubit 110 and the second qubit 120. When the first qubit 110 and the second qubit 120 are an atomic system or other solid state systems, an electric field may be applied to induce a Stark shift of the resonance frequencies 111, 121 or a magnetic field may be applied to induce a Zeeman shift of the resonance frequencies 111, 121.

Therefore, the first bias 112 and the second bias 122 will be used in this specification to refer to any control means or control variables of the first qubit 110 and the second qubit 120 facilitating the control of the first resonance frequency 111 and the second resonance frequency 121.

The coupler 130 is configured to mediate the coupling between the first qubit 110 and the second qubit 120.

The coupler 130 exhibits at least one resonance frequency. The corresponding resonance frequency will be referred to as a third resonance frequency 131. The coupler 130 is configured such that the third resonance frequency 131 is controlled by providing a third bias 132, labelled as 'C' in FIG. 1. Therefore, the third resonance frequency 131 is modelled to be dependent on the third bias 132 or as a function of the third bias 132 labelled as 'f(C)' in FIG. 1.

In some implementations, the coupler 130 may be a qubit.

In some implementations, the coupler 130 may be an LC resonator with a Josephson junction as the inductance.

In some implementations, the coupler 130 may be the same kind qubit as the first qubit 110 and/or the second qubit 120.

In some implementations, the coupler 130 may be a different type of qubit than the first qubit 110 and the second qubit 120. For example, when the first qubit 110 and the second qubit 120 are transmon qubits, the coupler 130 may be a gmon qubit.

In some implementations, the coupler 130 may be a resonator in which the resonance frequency, the third resonance frequency 131, is controlled by providing the third bias 132. For example, the coupler 130 may be a high quality factor resonator which couples to both the first qubit 110 and the second qubit 120.

The degree of coupling mediated by the coupler 130 between the first qubit 110 and the second qubit 120 will be referred to as a first degree of coupling 140-1, 140-2 in this specification.

The first degree of coupling 140-1, 140-2 is dependent on the first resonance frequency 111, the second resonance frequency 121 and the third resonance frequency 131, as will be explained in more detail later. Therefore, for given initial frequencies of the first qubit 110 and the second qubit 120, the first resonance frequency 111 and the second resonance frequency 121, respectively, the third bias 132 can be adjusted to control the first degree of coupling 140-1, 140-2.

In some implementations, for given initial frequencies of the first qubit 110 and the second qubit 120, the first resonance frequency 111 and the second resonance frequency 121, respectively, the third bias 132 can be adjusted to control the first degree of coupling 140-1, 140-2 such that the first degree of coupling 140-1, 140-2 is minimized or turned off. For example, the third bias 132 may be applied to the coupler 130 such that the third transition frequency 131 is shifted far from the first transition frequency 111 and the second transition frequency 121.

In some implementations, the first degree of coupling 140-1, 140-2 may be dependent on the third resonance frequency 131 in view of the first resonance frequency 111 and the second resonance frequency 121. For example, when the third resonance frequency 131 and the second resonance frequency 121 are close to each other, the second part of the first degree of coupling 140-1 may be larger than when they are further apart.

Therefore, the first degree of coupling 140-1, 140-2 in this specification represents a part of the coupling between the first qubit 110 and the second qubit 120 mediated by the coupler 130, which can be controlled by the third bias 132 applied to the coupler 130. In other words, the first degree of coupling 140-1, 140-2 corresponds to an indirect coupling between the first qubit 110 and the second qubit 120, facilitated by the coupler 130.

A first part 140-1 of the first degree of coupling represents the coupling between the first qubit 110 and the coupler 130. A second part 140-2 of the first degree of coupling represents the coupling between the second qubit 120 and the coupler 130.

The extent to which the first qubit 110 and the second qubit 120 are coupled not mediated by the coupler 130 will be referred to as a second degree of coupling 150 in this specification.

In some implementations, the first degree of coupling 140-1, 140-2 may arise from the spatial proximity between the coupler 130 and the first qubit 110 or the second qubit 120 and therefore depend on the distance between the coupler 130 and the first qubit 110 or the second qubit 120, respectively. For example, the mechanism of the first degree of coupling 140-1, 140-2 may include capacitive coupling, inductive coupling, dipolar coupling although possible mechanisms of coupling are not limited to these examples.

In some implementations, the first degree of coupling 140-1, 140-2 may arise from a common channel coupled to both the coupler 130 and first qubit 110 or the second qubit 120. For example, even if the coupler 130 is spatially far apart from the first qubit 110 and the second qubit 120 such that inductive coupling, capacitive coupling or dipolar coupling is negligible, the coupler 130 and the first qubit 110 or the second qubit 120 may be both coupled to a common bus such as a waveguide or a resonator, which can efficiently mediate the coupling between the coupler 130 and the first qubit 110 or the second qubit 120.

The second degree of coupling 150 represents the direct coupling between the first qubit 110 and the second qubit 120 which is present regardless of whether the first degree of coupling 140-1, 140-2 is present or not including when the first degree of coupling 140-1, 140-2 is made negligible. For example, when the third resonance frequency 131 is detuned far from the first resonance frequency 111 and the second resonance frequency 121, the first degree of coupling 140-1, 140-2 can be rendered negligible. The first qubit 110 and the second qubit 120 may still be coupled without the mediation of the coupler 130.

In the qubit-coupler-qubit system 100 described in FIG. 1, due to the direct coupling, or the second degree of coupling 150, even when the coupler 130 is far detuned from the first resonance frequency 111 and the second resonance frequency 121 such that the direct coupling or the first degree of coupling 140-1, 140-2 is negligible, the first resonance frequency 111 may shift in response to the change of the second bias 122 changes, and vice versa.

In some implementations, the second degree of coupling 150 may arise from the spatial proximity between the first qubit 110 and the second qubit 120 and therefore depend on the distance between the first qubit 110 and the second qubit 120. For example, the mechanism of the second degree of coupling 150 may include capacitive coupling, inductive coupling, dipolar coupling although the mechanism of the second degree of coupling are not limited to these examples.

In some implementations, the second degree of coupling 150 may arise from a common channel coupled to both the first qubit 110 and the second qubit 120. For example, even if the first qubit 110 and the second qubit 120 are spatially far apart such that inductive coupling, capacitive coupling or dipolar coupling is negligible, they may be both coupled to a common bus such as a waveguide or a resonator, which can efficiently mediate the coupling between the first qubit 110 and the second qubit 120. In this case, the first qubit 110 and the second qubit 120 can be coupled to each other without the mediation of the coupler 130.

In some implementations, the second degree of coupling 150 may be dependent on the first resonance frequency 111 and the second resonance frequency 121. For example, when the first resonance frequency 111 and the second resonance frequency 121 are close to each other, the second degree of coupling 150 may be larger than when they are further apart.

Therefore, the qubit-coupler-qubit system 100 described in FIG. 1 depends on at least three control variables: the first bias 112, the second bias 122 and the third bias 132. The first resonance frequency 111 and the second resonance frequency 121 can be modelled as a function of the first bias 112, the second bias 122 and the third bias 132. For example, as discussed above, the first resonance frequency 111 can be controlled by providing the first bias 112 to the first qubit 110, but the first resonance frequency 111 is also dependent on the second bias 122 and the third bias 132 due to the indirect coupling 140-1, 140-2 and the direct coupling 150 present in the qubit-coupler-qubit system 100.

This specification relates to a procedure to calibrate the qubit-coupler-qubit system 100. This specification also relates to a procedure to initialize the qubit-coupler-qubit system 100 using the model obtained from the calibration procedure, where the coupling between the first qubit 110 and the second qubit 120 is suppressed or turned off. Given the idle frequencies or the initial resonance frequencies 111, 121 of the first qubit 110 and the second qubit 120, the obtained model may be used to predictively set the third bias 132 of the coupler 130 to counteract the second degree of coupling 150 such that the first degree of coupling 140-1, 140-2 cancels out the second degree of coupling 150.

Figure 2:
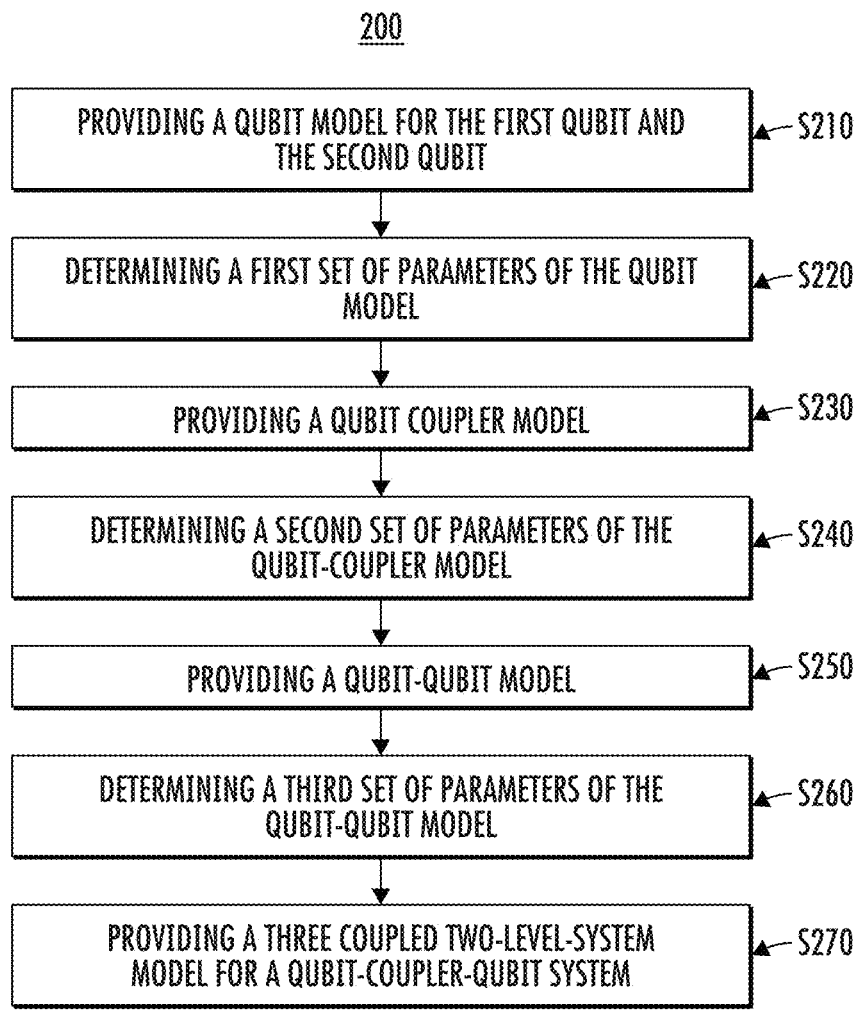
FIG. 2 is a flowchart that illustrates a method of calibrating a qubit-coupler-qubit system.

FIG. 2 is a flowchart that illustrates a method of calibrating a qubit-coupler-qubit system.

The method 200 of calibrating the qubit-coupler-qubit system 100 as described in FIG. 1 includes the following steps.

In step 210, a first model, a qubit model, is provided which describes the behavior of the first qubit 110 and the second qubit 120. In particular, the first model may be a function which outputs the first resonance frequency 111 and the second resonance frequency 121 when the first bias 112 and the second bias 122 are provided, respectively, as the variable. The first model corresponds to the functions labelled as 'f(A)' and 'f(B)' in FIG. 1.

In case the first qubit 110 and the second qubit 120 are the same type of qubits, one type of function may be used as the first model. In other words, 'f(A)' and 'f(B)' may be the same type of function with different set of parameters or coefficients.

In case the first qubit 110 and the second qubit 120 are different types of qubits, the first model may comprise two separate functions which respectively describe the behavior of the first resonance frequency 111 and the second resonance frequency 121 as a function of the first bias 112 and the second bias 122, respectively.

In some implementations, the first model, providing the first resonance frequency 111 and the second resonance frequency 121, may be a function of the respective bias, a first bias 112 and/or a second bias 122 independent of the first degree of coupling 140-1, 140-2 and the second degree of coupling 150.

In some implementations, the first model may describe the first resonance frequency 111 as a function of the first bias 112 and the second resonance frequency 121 as a function of the second bias 122 when the first qubit 110 and the second qubit 120 are isolated from other qubits or couplers.

In some implementations, if some conditions for the variables of the first model are known a priori, these may be incorporated into the first model.

The parameters of the first model will be referred to as a first set of parameters. The first set of parameters may be specific to experimental settings and/or the characteristics of the specific type of qubits 110, 120.

In step 220, the first set of parameters is determined such that the first model can be used to estimate the first resonance frequency 111 at a given value of the first bias 112 and the second resonance frequency 121 at a given value of the second bias 122.

In some implementations, the first set of parameters may be obtained by generating a first data set by measuring the first resonance frequency 111 at a plurality of values of the first bias 112 and by measuring the second resonance frequency 121 at a plurality of values of the second bias 122 and subsequently by fitting the first model to the first data set.

In some implementations, when the first data set is obtained at one of the qubits 110, 120, the resonance frequency of the other qubit 110, 120 and the coupler 130 may be shifted such that both the first degree of coupling 140-1, 140-2 and the second degree of coupling 150 are minimized or suppressed such that the influence of the indirect coupling 140-1, 140-2 and the direct coupling 150 is negligible. For example, when the first set of data for the first qubit 110 is obtained, the second resonance frequency 121 may be shifted far enough such that the direct coupling, the second degree of coupling 150 is negligible. Also, the third resonance frequency 131 may be shifted such that the coupler 130 does not mediate any coupling between the first qubit 110 and the second qubit 120.

In some implementations, in case the first qubit 110 and the second qubit 120 are the same type of qubits, as discussed in step 210, one type of function may be used as the first model. In this case, the first set of data may be obtained from both the first qubit 110 and the second qubit 120 to determine the first set of parameters. In this case, in some implementations, the first set of parameters may include two separate sets of parameters for the first qubit 110 and the second qubit 120 although one function is used as the first model.

For example, in case the first qubit 110 and the second qubit 120 are the same type of superconducting qubits, the first data set may include the first resonance frequencies 111 of the first qubit 110 at each value of the first bias 112 and the second resonance frequencies 121 of the second qubit 120 at each value of the second bias 122. The first data set including the data from both the first qubit 110 and the second qubit 120 may be used to fit the first model to determine the first set of parameters.

In some implementations, in case the first qubit 110 and the second qubit 120 are different types of qubits, as discussed in step 210, the first model may comprise two separate functions which respectively describe the behavior of the first resonance frequency 111 and the second resonance frequency 121 as a function of the first bias 112 and the second bias 122, respectively. In this case, the data obtained with the first qubit 110, namely the first resonance frequencies 111 at each value of the first bias 112 is used to fit the part of the first model for the first qubit 110 and the data obtained with the second qubit 120, namely the second resonance frequencies 121 at each value of the second bias 122 is used to fit the part of the first model for the second qubit 120.

For example, when the first qubit 110 is a transmon qubit and the second qubit 120 is a flux qubit, the first model includes a model for the transmon qubit with undetermined parameters and a model for the flux qubit with undetermined parameters. These parameters may be evaluated separately for the first qubit 110 and the second qubit 120.

As a result of steps 210 and 220, the first model is obtained which evaluates the first resonance frequency 111 and the second resonance frequency 121 for a given value of or in response to the first bias 112 and the second bias 122, respectively when they are isolated from the other qubits and couplers.

In step 230, a second model, a qubit-coupler model, is provided which describes the behavior of the qubit-coupler system, namely a coupled system comprising the first qubit 110 and the coupler 130 or comprising the second qubit 120 and the coupler 130. In particular, the second model may be a function which outputs the first resonance frequency 111 or the second resonance frequency 121 with the third bias 131 as a variable. The second model contains the first part of the first degree of coupling 140-1 and the second part of the first degree of coupling 140-2 as parameters.

The second model is a function of the third bias 131. In particular, the second model describes a system containing the coupler 130 and only one of the qubits 110, 120. For example, the second model may describe the behavior of the system containing the first qubit 110 and the coupler 130 when the second resonance frequency 121 of the second qubit 120 is shifted such that neither the direct coupling 140-1, 140-2 and the direct coupling 150 between the first qubit 110 and the second qubit 120 are suppressed. In this case, the second model contains the first part of the first degree of coupling 140-1 as a parameter to be determined.

If some conditions for the variables of the second model are known a priori, these may be incorporated into the second model.

In case the first qubit 110 and the second qubit 120 are the same type of qubits, one type of function with undetermined parameters may be used as the second model, which applies both to the coupling between the first qubit 110 and the coupler 130, the first part of the first degree of coupling 140-1, and to the coupling between the second qubit 120 and the coupler 130, the second part of the first degree of coupling 140-2.

In case the first qubit 110 and the second qubit 120 are different types of qubits, the first model may comprise two separate functions which respectively describe the behavior of the first resonance frequency 111 as a function of the third bias 131 and the behavior of the second resonance frequency 121 as a function of the third bias 131.

The parameters of the second model will be referred to as a second set of parameters. The second set of parameters may be specific to experimental settings and/or the characteristics of the specific type of qubits 110, 120 and the coupler 130.

In some implementations, the second set of parameters may comprise two separate sets of parameters, respectively for the first system including the first qubit 110 and the coupler 130 and the second system including the second qubit 120 and the coupler. The former includes the first part of the first degree of coupling 140-1 and the latter includes the second part of the first degree of coupling 140-2.

In step 240, the second set of parameters of the qubit-coupler model or the second model is determined such that the second model can be used to estimate the first resonance frequency 111 at a given value of the third bias 132 and the second resonance frequency 121 at a given value of the third bias 132.

In some implementations, the second set of parameters may be obtained by generating a second data set by measuring the first resonance frequency 111 at a plurality of values of the third bias 132 and by measuring the second resonance frequency 121 at a plurality of values of the third bias 132 and subsequently by fitting the second model to the second data set.

In some implementations, when the second data set is obtained at one of the qubits 110, 120, the resonance frequency of the other qubit 110, 120 may be shifted such that the second degree of coupling 150 are minimized. For example, in order to determine the second set of parameters of the second model which relates to a system containing the first qubit 110 and the coupler 130, the second resonance frequency 121 may be shifted far enough such that the direct coupling, the second degree of coupling 150 is negligible or suppressed.

In some implementations, the second data set may be obtained at a plurality of values of the first bias 112 or at a plurality of values of the second bias 122. For example, when the part of the second data set is obtained from a system containing the first qubit 110 and the coupler 130, the data set may be obtained at a plurality of values of the first bias 112 such that the accuracy of determining the second set of parameters can be improved.

In case the first qubit 110 and the second qubit 120 are the same type of qubits, one type of function may be used as the second model. In this case, the first set of data may be obtained between two sets of experiments, namely between the first qubit 110 and the coupler 130 and the second qubit 120 and the coupler 130, to determine the second set of parameters.

In some implementations, the second set of parameters may include separate sets of parameters for a first pair including the first qubit 110 and the coupler 130 and a second pair including the second qubit 120 and the coupler 130. Each of the two sets of experiments may be used to fit the separate sets of the parameters. The set of parameters for the first pair including the first qubit 110 and the coupler 130 includes the first part of the first degree of coupling 140-1. The set of parameters for the second pair including the second qubit 120 and the coupler 130 includes the second part of the first degree of coupling 140-2.

For example, in case the first qubit 110 and the second qubit 120 are the same type of superconducting qubits, the resonance frequency of each qubit 110, 120 can be recorded while sweeping the magnetic flux bias applied to the coupler 130. Then the second data set includes the first resonance frequencies 111 of the first qubit 110 at a plurality of values of the third bias 132 and the second resonance frequencies 121 of the second qubit 120 at a plurality of values of the third bias 132. The second data set including the data from both the first pair including the first qubit 110 and the coupler 130 and the second pair including the second qubit 120 and the coupler 130 may be used to fit the second model to determine the second set of parameters.

In case the first qubit 110 and the second qubit 120 are different types of qubits, as discussed in step 230, the second model may comprise two separate functions which respectively describe the first resonance frequency 111 as a function of the third bias 132 and the second resonance frequency 121 as a function of the third bias 132. In this case, the data obtained with the first pair including the first qubit 110 and the coupler 130 is used to fit the corresponding part of the second model, which describes the coupling between the first qubit 110 and the coupler 130 and the data obtained with the second pair including the first qubit 110 and the coupler 130 is used to fit the corresponding part of the second model, which describes the coupling between the second qubit 120 and the coupler 130.

For example, when the first qubit 110 is a transmon qubit and the second qubit 120 is a flux qubit, the second model includes a model for the coupling between the coupler 130 and the transmon qubit with undetermined parameters and a model for the coupling between the coupler 130 and the flux qubit with undetermined parameters. These parameters may be evaluated separately.

In some implementations, the second model may comprise a coupled two-level-system model when the coupler 130 comprises a system which can be described as a two-level-system such as a transmon qubit.

As a result of steps 230 and 240, the second model, qubit-coupler model, is obtained which evaluates the first resonance frequency 111 at a given value of the third bias 132 when the second qubit 120 is decoupled from the first qubit 110 and evaluates the second resonance frequency 121 at a given value of the third bias 132 when the first qubit 110 is decoupled from the second qubit 120.

Also, the coupling efficiencies between the first qubit 110 and the coupler 130 and between the second qubit 120 and the coupler 130 are evaluated, corresponding to the first part of the first degree of coupling 140-1 and the second part of the first degree of coupling 140-2, respectively.

In step 250, a third model, a qubit-qubit model, is provided which describes the behavior of the qubit-qubit system, namely a coupled system comprising the first qubit 110 and the second qubit 120. In particular, the third model may be a function which outputs the first resonance frequency 111 with the second bias 122 as a variable or outputs the second resonance frequency 121 with the first bias 112 as a variable. The third model contains the second degree of coupling 150 as a parameter.

In some implementations, the third model may include two functions, one of which is formulated as a function which outputs the first resonance frequency 111 with the second bias 122 as a variable, and the other of which is formulated as a function which outputs the second resonance frequency 121 with the first bias 112 as a variable.

Alternatively, in some implementations, the third model may be formulated as a function of both the first bias 112 and the second bias 122 as variables.

In some implementations, the third model may be formulated as a function of the first bias 112, the second bias 122 and the third bias 132 as variables.

If some conditions for the variables of the third model are known a priori, these may be incorporated into the third model. The parameters of the third model will be referred to as a third set of parameters. The third set of parameters may be specific to experimental settings and/or the characteristics of the specific type of qubits 110, 120.

In some implementations, the third set of parameters may include the values for the variables of the third model other than the first bias 112 or the second bias 122 which can be controlled and set as desired. For example, when the third model is formulated as a function of both the first bias 112 and the second bias 122 as variables, either the value of the first bias 112 or the second bias 122 may be included in the third model. For another example, the coupling between the first qubit 110 and the second qubit 120 may be dependent on the third bias 132 and a specific value of the third bias 132 may be incorporated into the third model. Alternatively, the value of the third bias 132 may be a part of the third set of parameters.

In step 260, the third set of parameters of the qubit-qubit model or the third model is determined such that the third model can be used to estimate the first resonance frequency 111 at a given value of the second bias 122 or to estimate the second resonance frequency 121 at a given value of the first bias 112.

In some implementations, the third set of parameters may be obtained by generating a third data set by measuring the first resonance frequency 111 at a plurality of values of the second bias 122 and by measuring the second resonance frequency 121 at a plurality of values of the first bias 112 and subsequently by fitting the third model to the third data set.

In some implementations, when the third data set is obtained, the resonance frequency of the coupler 130 may be set at a predetermined position. The corresponding value of the third bias 132 may be incorporated into the third model or the third bias 132 may be part of the third set of parameters such that it can be evaluated by fitting the third data set to the third model. For example, when the coupler 130 is a transmon qubit, the third bias 132 may be set such that the third transition frequency 131 is at the maximum frequency of the transmon qubit.

Alternatively, in some implementations, when the third data set is obtained, the resonance frequency of the coupler 130 may be shifted far from the first resonance frequency 111 and the second resonance frequency 121 such that the first degree of coupling 140-1, 140-2 is negligible or suppressed.

As discussed in step 230, in some implementations, the third model may be formulated as two functions. One function may output the first resonance frequency 111 with the second bias 122 as a variable, and the other function may output the second resonance frequency 121 with the first bias 112 as a variable. Alternatively, in some implementations, the third model may be formulated as a function of both the first bias 112 and the second bias 122 as variables. In both cases, the third data set may be generated by measuring the first resonance frequency 111 at a plurality of values of the second bias 122 and by measuring the second resonance frequency 121 at a plurality of values of the first bias 112.

In some implementations, the third data set may be generated by measuring only the first resonance frequency 111 at a plurality of values of the second bias 122 or by measuring only the second resonance frequency 121 at a plurality of values of the first bias 112. This is in case the third data set obtained in only one of the measurements provides a necessary level of accuracy in determining the third set of parameters.

In some implementations, the third model may comprise a coupled two-level-system model.

As a result of steps 250 and 260, the third model, qubit-qubit model, is obtained which evaluates the first resonance frequency 111 in response to the second bias 122 and/or the second resonance frequency 121 in response to the first bias 112. Also, the coupling efficiency between the first qubit 110 and the second qubit 120 is evaluated, corresponding to the second degree of coupling 150.\

In step 270, a fourth model is provided which describes the behavior of the complete qubit-coupler-qubit system 100, namely a coupled system comprising the first qubit 110, the second qubit 120 and the coupler 130 as described in FIG. 1.

The fourth model may include the first part of the first degree of coupling 140-1, the second part of the first degree of coupling 140-2 and the second degree of coupling 150 as parameters or coefficients.

In some implementations, the fourth model may be a three coupled two-level-system model. For example, the fourth model may be formulated as a 3×3 Hamiltonian in the single-excitation subspace in the rotating frame, as will be discussed in more detail later. In particular, the fourth model may describe the system dynamics of the qubit-coupler-qubit system 100 and may be formulated as a function of the first resonance frequency 111, the second resonance frequency 121 and the third resonance frequency 131. As a result of steps 210 and 220, the first resonance frequency 111 and the second resonance frequency 121 may be converted to the first bias 112 and the second bias 122, respectively and vice versa.

In some implementations, the fourth model may describe the system dynamics of the qubit-coupler-qubit system 100 and may be formulated as a function of the first bias 112, the second bias 122, and the third bias 132.

Figure 3:
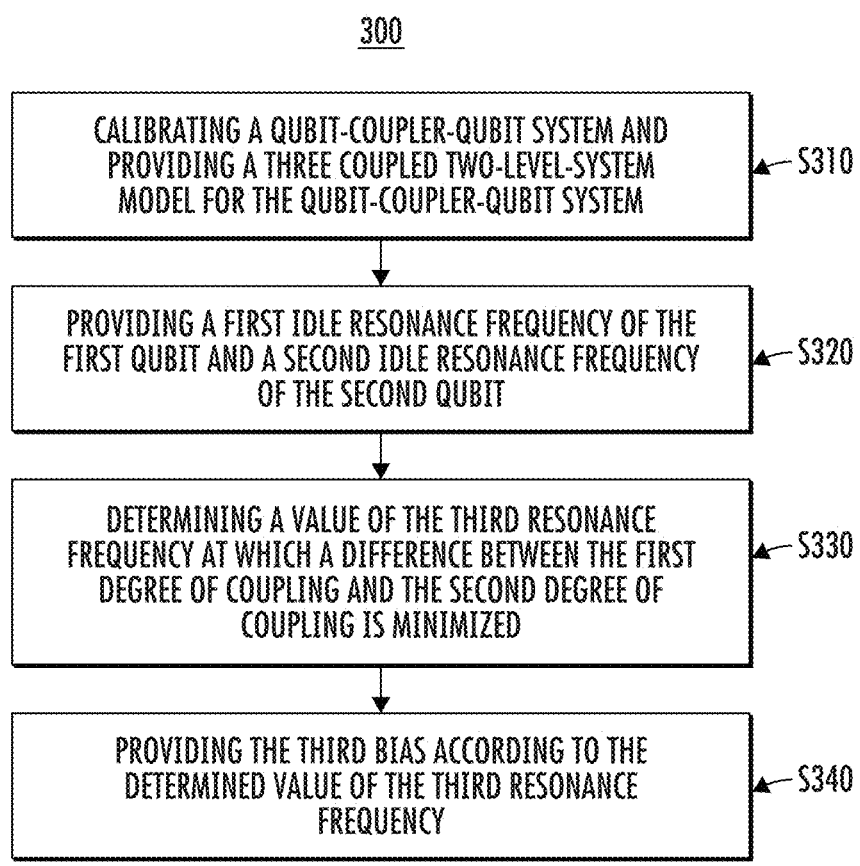
FIG. 3 is a flowchart that illustrates a method of initializing a qubit-coupler-qubit system.

FIG. 3 is a flowchart that illustrates a method of initializing a qubit-coupler-qubit system.

The method 300 of initializing the qubit-coupler-qubit system 100 as described in FIG. 1 includes the following steps.

In step 310, the qubit-coupler-qubit system 100 is calibrated and a model describing the qubit-coupler-qubit system 100 is provided. Step 310 is described in detail in FIG. 2. As a result of the calibration process of the qubit-coupler-qubit system 100, as described in FIG. 2, the respective relations between the first resonance frequency 111 and the second resonance frequency 121 and the first bias 112 and the second bias 122 are identified (steps 210 and 220). In addition, the first degree of coupling 140-1, 140-2 is evaluated (steps 230 and 240). The second degree of coupling 150 is evaluated (steps 250 and 260). A model is provided describing the system dynamics of the qubit-coupler-qubit system 100 and may be formulated as a function of the first resonance frequency 111, the second resonance frequency 121 and the third resonance frequency 131 (step 270).

In step 320, a first idle resonance frequency 111' of the first qubit 110 and a second idle resonance frequency 121' of the second qubit 120 are provided.

The first idle resonance frequency 111' and the second idle resonance frequency 121' are the desired initial qubit frequencies. These may be determined by the requirement of the computation algorithm to be performed. As discussed above, the qubit-coupler-qubit system 100 may be a part of a larger system containing additional qubits and couplers or a plurality of the qubit-coupler-qubit system 100. Therefore, the first idle frequency 111' and the second idle frequency 121' may be determined in view of the initialization of the larger system.

In step 330, a value of the third resonance frequency 131 is determined, at which a difference between the first degree of coupling 140-1, 140-2 and the second degree of coupling 150 is minimized or suppressed.

The value of the third resonance frequency 131 or the third bias 132 may be evaluated using the fourth model.

When the first resonance frequency 111 and the second resonance frequency 121 are substituted by the first idle resonance frequency 111' and the second idle frequency 121', respectively, the only remaining variable of the fourth model is the third resonance frequency 131 or equivalently, the third bias 132. The third resonance frequency 131 can be determined such that the coupling between the first qubit 110 and the second qubit 120, including the indirect coupling 140-1, 140-2 and direct coupling 150, is minimized. At the value of the third resonance frequency 131 which minimizes the coupling between the first qubit 110 and the second qubit 120, the indirect coupling mediated by the coupler 130, which includes the first part of the first degree of coupling 140-1 and the second part of the first degree of coupling 140-2 may match the second degree of coupling 150 in magnitude but acts in an opposite direction such that the coupling mediated by the coupler 130 and the direct coupling between the first qubit 110 and the second qubit 120 cancel each other. In this case, the difference between the coupling mediated by the coupler 130 and the direct coupling between the first qubit 110 and the second qubit 120 may be approximately or effectively minimized. The term "approximately" here may refer to a tolerance below, for example, 5% of the stated value.

For example, in case the fourth model is formulated as may be as a 3×3 Hamiltonian in the single-excitation subspace in the rotating frame representing a three coupled two-level-system model, the odd mode qubit eigenfrequency and the even mode qubit eigenfrequency may be evaluated from the Hamiltonian. The third resonance frequency 131 at which the coupling between the first qubit 110 and the second qubit 120 is minimized may be found by equating the even mode qubit eigenfrequency and the odd mode qubit eigenfrequency. This will be discussed in more detail later.

In step 340, the third bias 132 is provided to the coupler 130 according to the determined value of the third resonance frequency 131 of step 330.

The concepts described in FIGS. 1 to 3 apply to any types of qubits as the first qubit 110 and the second qubit 120 as long as the transition frequencies 111, 121 are controlled by providing appropriate biases 112, 122.

As an example, the procedures described in FIGS. 2 and 3 will be exemplified with frequency tunable transmon (FT-XMON) qubits as the first qubit 110 and the second qubit 120 in this specification. The transmon qubits are superconducting qubits where a specific ratio of junction critical current of the SQUID and capacitance is met to be in the transmon regime. However, other designs are possible for the first qubit 110 and the second qubit 120. For example, a ratio of junction critical current of the SQUID and capacitance not in the transmon regime may be chosen, such as fluxmon qubits or gmon qubits, among others.

Similarly, the concepts and the procedures described in FIGS. 1 to 3 apply to any types of resonator as the coupler 130 in which the resonance frequency 131 can be controlled by providing appropriate bias 132. However, in the examples below, the coupler 130 will be assumed to be another superconducting qubit mentioned above or a quantum LC resonator containing a Josephson junction as a nonlinear element such as a DC SQUID or an RF SQUID.

FIG. 4 shows a schematic of a frequency tunable transmon qubit and an energy diagram.

A frequency tunable transmon (FT-XMON) qubit, or a transmon qubit 400 is a parallel LC circuit. The LC circuit comprises a capacitor 401 and a nonlinear inductor 402. The nonlinear inductor 402 is configured such that its inductance varies according to the level of the applied current.

The transmon qubit 400 may be constructed with a superconducting material, a material which becomes superconducting below a transition temperature. For example, the LC circuit may be constructed as a coplanar waveguide within an aluminum layer deposited on a dielectric substrate such as Sapphire or Silicon. The superconducting transition temperature of the aluminum is around 1K, and the transmon qubit 400 may be operated at around 10 mK temperature.

In some implementations, the capacitance, which is represented as the capacitor 401 in FIG. 4a, may be determined by the spatial extent within the plane of the substrate or the geometry of the coplanar waveguide forming the transmon qubit 400.

In some implementations, the nonlinear inductor 402 may include a Josephson junction 403, 404. The Josephson junctions 403, 404 may be formed by a thin insulating barrier interrupting two superconducting electrodes. For example, a Josephson junction may form an aluminum-aluminum oxide-aluminum structure.

In some implementations, the nonlinear inductor 402 may be a superconducting quantum interference device, or a SQUID 402. As in the example of FIG. 4a, the SQUID 402 may be formed as a superconducting loop including two parallel Josephson junctions, a first Josephson junction 403 and a second Josephson junction 404. The transition frequency or the resonance frequency of the transmon qubit 400 can be dynamically changed or tuned by providing a magnetic flux threaded through the loop of the SQUID 402 because the magnetic flux threading the SQUID loop 402 changes the effective inductance of the SQUID loop 402.

In some implementations, in place of the SQUID 402 with two Josephson junctions 403, 404, a single Josephson junction can be used as the nonlinear inductor 402.

In the examples below, the first qubit 110 and the second qubit 120 will be taken to be the transmon qubit 400. The transition frequency of the transmon qubit 400 corresponds to the first resonance frequency 111 or the second resonance frequency 112 in the diagram of FIG. 1 and the magnetic field or the magnetic flux corresponds to the first bias 112 or the second bias 122 in the diagram of FIG. 1.

The magnetic flux is provided with an external magnetic flux drive (not shown in FIG. 4), which will be referred to as a Z control line in this specification. For example, the Z control line may include a current source and a coil positioned in the vicinity of the transmon qubit 400 such that a magnetic flux is generated when the current flows through the coil. Since the mutual inductance between the external magnetic flux drive and the SQUID loop 402 depends on the specific geometry of the transmon qubit 400 and the Z control line and the experimental setting such as the distance between the transmon qubit 400 and the Z control line, the mutual inductance may be difficult to design or predict a priori. Therefore, the mutual inductance between the Z control line and the transmon qubit 400 may be set as a free parameter of the first model and calibrated once the transmon qubit 400 is operational with the Z control line at a cryogenic condition, as part of steps 210 and 220 discussed above.

The inductance of the Josephson junction 403, 404, so-called Josephson inductance, is known to be dependent on the phase difference across the junction and be proportional to the critical current of the Josephson junction. Assuming a fixed critical current, Josephson inductance is proportional to inverse cosine of the phase across the Josephson junction.

$$L \sim \frac{1}{\cos\left(\frac{\pi\varphi}{\varphi_0}\right)}$$

φ represents the magnetic flux through the SQUID 402, which is here assumed to be a DC SQUID. $\varphi_0$ represents the magnetic flux quantum. Therefore, the Josephson inductance varies as a function of the magnetic flux provided through the loop of the DC SQUID 402.

Since the transmon qubit 400 is constructed as an LC circuit, where L corresponds to the Josephson inductance of the Josephson junction 402, 403. It is well known that the resonance frequency of an LC circuit is given by $$f = \frac{1}{2\pi\sqrt{LC}}$$

Therefore, the resonance frequency, or the transition frequency of the transmon qubit 400 may be expressed as a function of the magnetic flux through the DC SQUID as $$f_{Qubit}(\varphi) = f_{max}\sqrt{\cos\left(\frac{\pi\varphi}{\varphi_0}\right)}$$

$f_{max}$ represents the maximum resonance frequency of the qubit. This description applies in general to any superconducting qubits constructed as an LC circuit with the L as a nonlinear inductance. The maximum resonance frequency of the qubit, $f_{max}$ also represents a flux insensitive point. Around the flux insensitive point, the resonance frequency of the qubit 400 will be more robust to the fluctuation of the magnetic flux than other values of the magnetic flux. This is because the cosine squared curve is symmetric around the flux insensitive point and the rate of change of the resonance frequency with respect to the change of the magnetic flux is smallest. Therefore, the maximum resonance frequency or the flux insensitive point may be relatively robust to the noise arising from spurious fluctuation of the magnetic flux from the environment. The measurement data of the cosine squared behavior will be shown in FIG. 5b.

When the first qubit 110 and the second qubit 120 are transmon qubits, the first resonance frequency 111 and the second resonance frequency 121 are proportional to the square root of cosine of the magnetic flux applied to the first qubit 110 and the second qubit 120, respectively, namely the first bias 112 and the second bias 122. Therefore, the first transition frequency 111 and the second transition frequency 121 are a periodic function of the first bias 112 and a second bias 122, respectively.

The maximum resonance frequency of the qubit, $f_{max}$ depends on the specific geometry of the transmon qubit 400, for example, the capacitance value of the transmon qubit 400 and the dimensions of the Josephson junctions 403, 404. Therefore, the maximum resonance frequency may be difficult to determine or predict a priori. Therefore, the maximum frequency may be set as a free parameter of the first model and calibrated once the transmon qubit 400 is operational with the Z control line at a cryogenic condition, as part of steps 210 and 220 discussed above. As discussed above, since the transition frequency of the transmon qubit 400 is a periodic function of the magnetic flux, $f_{max}$ may occur for a plurality of values of the magnetic flux through the SQUID loop 402. For a transmon qubit, typical $f_{max}$ may be between about 3 GHz and about 10 GHz.

Since the LC circuit forming the transmon qubit 400 includes a nonlinear inductor 402, the transmon qubit 400 is a nonlinear resonator with a resonance frequency in the microwave regime. The anharmonicity of the nonlinear resonator leads to unequally spaced energy levels as shown in a potential energy diagram 430 of the transmon qubit 400. The potential energy diagram 430 shows the potential energy of the transmon qubit 400 in a vertical axis 432 as a function of the magnetic flux traversing the SQUID loop 402 of the transmon qubit 400 in a horizontal axis 431. The potential energy diagram 430 shows that the potential energy shows a periodic behavior as the magnetic flux increases. As discussed above, since the magnetic flux changes the transition frequency of the transmon qubit 400, one of the potential wells may be chosen for a desired operation of the transition frequency. The lowest two levels of one of these potential wells, are used as a qubit, namely '0' and '1' states. The quantum mechanical two-level-system defined by these two levels will be referred to as a qubit transition, a 0-1 transition or a single excitation subspace in this specification.

The transmon qubit 400 is coupled to a readout resonator 410. The transmon qubit 400 is connected to an interface circuitry 420 via the readout resonator 410.

In some implementations, the transmon qubit 400 may be coupled to the readout resonator 410 via a capacitor, as shown in FIG. 4a.

In some implementations, the readout resonator 410 is coupled inductively to the interface circuitry 420.

In some implementations, the interface circuitry 420 may include a transmission line.

In some implementations, the interface circuitry 420 may include driving electronics. The driving electronics may include an arbitrary waveform generator (AWG). The driving electronics may be configured to generate a probing signal, an RF or microwave signal, to drive the readout resonator 410 for the state detection of the transmon qubit 400.

In some implementations, the interface circuitry 420 may include detection electronics. The detection electronics may include an amplifier network comprising one or more of an impedance matched parametric amplifier (IMPA) and a high electron mobility transistor (HEMT). When the RF or microwave signal generated at the driving electronics as part of the interface circuitry 420 is sent into the readout resonator 410, the reflected signal is sent into the amplifier network for the state detection of the transmon qubit 400.

The readout resonator 410 is introduced to enhance the coherence of the qubit 400 by protecting the transmon qubit 400 from the dissipation caused by the interface circuitry 420. In order to act as a short at the qubit transition frequency, the readout resonator 410 is detuned from the transition frequency of the transmon qubit 400. Since the transmon qubit 400 and the readout resonator 410 are strongly coupled, the shift of the transition frequency of the qubit 400 causes the resonance frequency of the readout resonator 410 to shift. The resonance frequency of the readout resonator 410 changes depending on the state of the qubit 400.

Since the coupling efficiency between the transmon qubit 400 and the readout resonator 410 depends on the specific geometry such as the physical distance and the relative arrangement and the experimental setting, it may be difficult to determine or predict a priori. Therefore, the coupling efficiency between the transmon qubit 400 and the readout resonator 410 may be calibrated once the transmon qubit 400 is operational at a cryogenic condition, in steps 210 and 220 discussed above.

In some implementations, the state detection of the transmon qubit 400 is achieved using a dispersive detection scheme, or equivalently, dispersive measurement or dispersive readout scheme. In order to read out or detect the state of any qubit, a probing signal, e.g., a travelling microwave, may be sent along a readout transmission line of the interface circuitry 420 into the readout resonator 410. The frequency of the probing signal generated by the driving electronics may be in the vicinity of the resonance frequency of the readout resonator 410. Depending on the internal quantum mechanical state of the qubit 400, the intensity or phase of the probing signal transmitted along the readout transmission line may be altered because the reflectivity of the readout resonator coupled to the qubit changes depending on the state of the qubit. This allows for the state detection of the qubits.

In some implementations, the interface circuitry 420 may include a Purcell filter. A high degree of coupling between the driving electronics of the interface circuitry 420 and the readout resonator 410 may improve the detection speed but may also affect the coherence time of the qubit 400 by providing further decay channels. In order to mitigate this effect, the Purcell filter, configured as a relatively low quality factor resonator, around Q of 30, may be introduced between the readout resonator 410 and the driving electronics. In some implementations, the readout resonator 410 is coupled inductively to the Purcell filter.

In the rest of the specification, the method 200 of calibrating the qubit-coupler-qubit system 100 and the method 300 of initializing the qubit-coupler-qubit system 100 will be described with two transmon qubits 400 as the first qubit 110 and the second qubit 120. However, as stated above the methods 200, 300 described herein are not limited to the transmon qubits 400 for the first qubit 110 and the second qubit 120.

The coupler 130 of the qubit-coupler-qubit system 100 in the following example will be taken to be another transmon qubit 400. However, as stated above the methods 200, 300 described herein are not limited to the transmon qubits 400 as the coupler 130. The coupler 130 may be a qubit or a resonator whose resonance frequency 131 is controllable with the third bias 132.

Figure 5A:
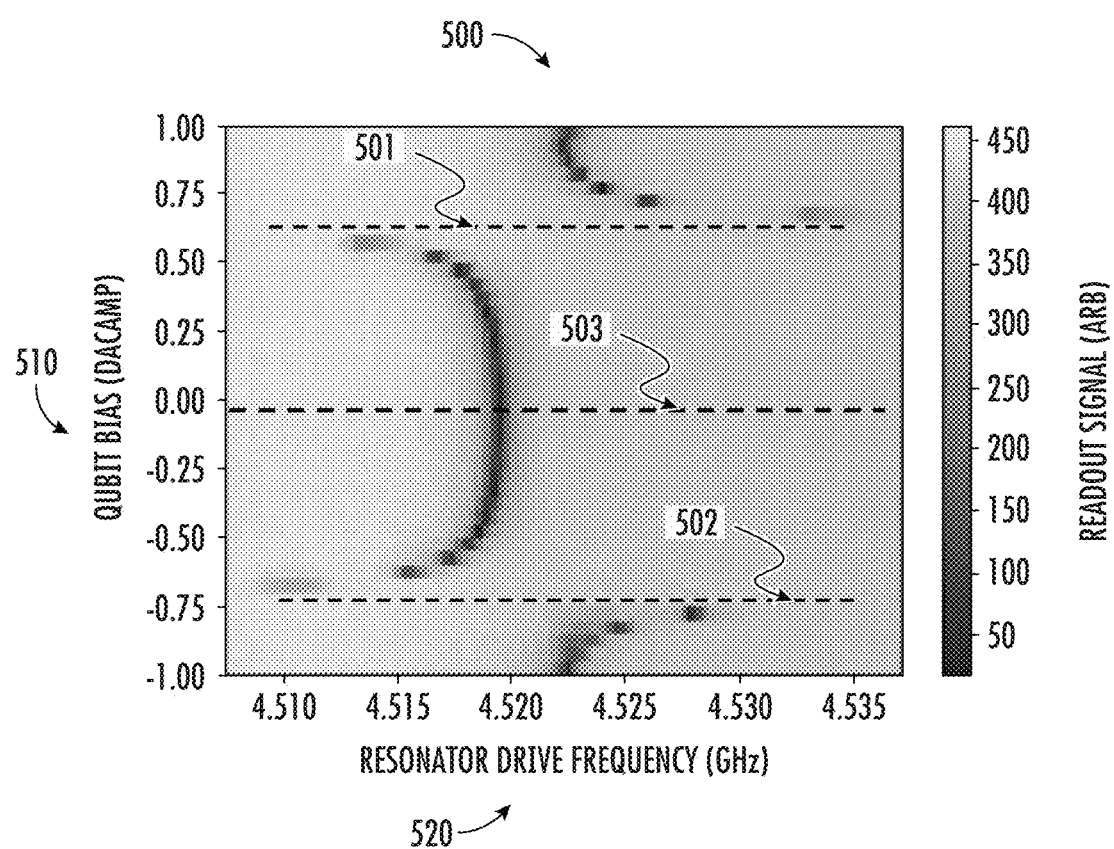
FIG. 5a shows a measurement data of the resonance frequency of the readout resonator of a transmon qubit as a function of the flux bias applied to the transmon qubit.

FIG. 5*a* shows a measurement data of the resonance frequency of the readout resonator of a transmon qubit as a function of the flux bias applied to the transmon qubit.

A first graph 500 shows a measurement of the resonance frequency of the readout resonator 410 coupled to the transmon qubit 400, which acts as, for example, the first qubit 110 of the qubit-coupler-qubit system 100. Similar measurement can be repeated for the readout resonator 410 of the transmon qubit 400 which acts as the second qubit 120 of the qubit-coupler-qubit system 100.

As part of steps 210 and 220, the resonance frequency of the readout resonator 410 is measured as the first bias 112, the magnetic flux applied by the Z control line into the SQUID loop 402 is changed. The first bias 112 is represented in a vertical axis 510, labelled as 'Qubit bias (dacamp).' 'dacamp' represents a DAC voltage controlling the Z control line.

The frequency of the probing signal, labelled as 'Resonator drive frequency (GHz)', is represented in a horizontal axis 520.

As discussed above, the probing signal, generated by the driving electronics of the interface circuitry 420 is reflected from the readout resonator 410 and couples back into the interface circuitry 420 to be detected by the detection electronics. The lines on the first graph 500 represents the frequency position of the readout resonator 410 and the width of the line in the horizontal direction represents the linewidth of the readout resonator 410.

As the first bias 112 is changed, the first transition frequency 111 correspondingly changes. Since the transmon qubit 400 and the readout resonator 410 are strongly coupled, the resonance frequency of the readout resonator 410 shifts accordingly.

Although the resonance frequencies of the qubits 110, 120, 400 and the resonance frequency of the corresponding readout resonators 410 are designed to be at predetermined frequencies, these can be confirmed with the measurement shown in the first graph 500, thereby providing a calibration of the isolated qubits 110, 120. Also the observation that the resonance frequency of the readout resonator 410 shifts as a function of the first bias 112 confirms that the readout resonator 410 and the transmon qubit 400 are coupled to each other and that the Z control line is connected and is operational.

The first graph 500 shows three segments of measured traces, which are separated by a first line 501 and a second line 502, namely one above the first line 501, one between the first line 501 and the second line 502 and one below the second line 502. Two of the segments are tangential to the first line 501 which is parallel to the horizontal axis, representing a value of the first bias 112, or the flux threaded through the SQUID loop 402, around 0.6 dacamp. Two of the segments are tangential to the second line 502 which is parallel to the vertical axis, representing a value of the first bias 112, or the flux threaded through the SQUID loop 402, around −0.75 dacamp. The segment shown in the middle is tangential to both the first line 501 and the second line 502. For example, around the first line 501, the middle segment of the trace diverges towards the negative direction in the horizontal axis, and the top segment of the trace diverges towards the positive direction in the horizontal axis. This so-called "avoided crossing" behavior of the resonance frequencies of the coupled resonator system is a signature that two resonators, in this case the transmon qubit 400 and the readout resonator 410, are strongly coupled. A degree of separation between the two segments of the measurement curves on either side of the first line 501 and the second line 502 reflects the coupling efficiency between the readout resonator 410 and the transmon qubit 400. Two coupled resonators or oscillators can be described by the coupled two-level-systems model. Therefore, in some implementations, the first model, or the qubit model for steps 210 and 220 may be formulated based on the coupled two-level systems model.

A third line 503, which is parallel to the horizontal axis, represents a value of the first bias 112, or the flux threaded through the SQUID loop 402, around 0.00 dacamp, which represents DAC amplitude. The third line 503 points to a point of the measurement trace where the resonance frequency curve is flat with respect to the change of the first bias 112 or the magnetic flux. This point corresponds to the maximum frequency of the qubit 400 or the flux insensitive point, as discussed above. As explained above, this point occurs theoretically when the magnetic flux is zero, but due to the stray magnetic fields from the experimental setting near the transmon qubit 400 and the readout resonator 410, the flux insensitive point may be offset from zero. Therefore, in some implementations, the first model, or the qubit model for steps 210, 220 may include the flux offset as a free parameter.

When the flat point occurs near the third line 503, the line tangential to the measurement trace points to, corresponds to the maximum frequency of the transmon qubit 400 in the horizontal axis 520. In FIG. 5a, the maximum frequency is approximately 4.520 GHz. Although the maximum frequency is predetermined in the design stage, the actual maximum frequency may turn out to be different from the design value. Therefore, in some implementations, the first model, or the qubit model for steps 210 and 220 may include the maximum frequency of the qubit 400 as a free parameter.

The vertical axis 510 in FIG. 5a is in 'dacamp' which represents DAC amplitude. In FIG. 5a, the DAC amplitude ranges from −1V to 1V. The Z control line configured to generate magnetic flux for the first bias 112, may include a current source, controlled by the DAC voltage and a transducer to generate magnetic flux from the current generated by the current source. Therefore, the DAC amplitude in the vertical axis 510 is in general proportional to the magnetic flux threaded through the SQUID loop 420. However, the conversion of the DAC amplitude and the physical units of the actual magnetic flux threaded through the SQUID loop 420 may depend on various factors, such as the mutual inductance between the Z control line and the SQUID loop 420 of the qubit 400. Therefore, in some implementations, the first model, or the qubit model for steps 210 and 220 may include the mutual inductance between the qubit and the Z control line as a free parameter.

Steps 210 and 220 are performed by taking measurements of the resonance frequency of the readout resonator 410 as a function of the first bias 112 or the flux bias applied to the qubit 400, and fitting the data to the first model.

In some implementations, the first model, or the qubit model is formulated based on the coupled two-level-system model and may include the flux offset of the flux insensitive point, the mutual inductance between the qubit 400 and the Z control line, the maximum frequency of the qubit 400, and the coupling efficiency between the qubit 400 and the readout resonator 410. The first model may include more free parameters depending on the design of the qubit 400 or the experimental settings, such as the interface circuitry 420. Also, some of the parameters above may be removed from the first model if the value of that parameter can be identified a priori with sufficient accuracy.

As mentioned above for steps 210 and 220, when the measurements shown in FIG. 5a is performed on the first qubit 110, the second qubit 120 and the coupler 130 may be shifted away from the relevant frequency range for the first qubit 110, namely the resonance frequency of the transmon qubit 400 and the readout resonator 410 such that they are not coupled to the first qubit 110. In some implementations, the resonance frequencies of the second qubit 120 and the coupler 130, when the coupler 130 is another qubit, may be shifted towards their minimum frequencies.

The measurements in the first graph 500 shows the resonance frequency of the readout resonator 410 coupled to the qubit 400 and the measured frequency is not the bare resonance frequency of the readout resonator 410. The resonance frequency in the first graph 500 corresponds to an eigenmode of the coupled two-level-system model, equivalently, a hybridized mode or a mixed state. Therefore, as a result of performing steps 210 and 220, including the measurements shown in FIGS. 5a and 5b, the bare frequency of the qubit 400, isolated from the readout resonator 400, and the bare resonance frequency of the readout resonator 410 isolated from the qubit 400 may be inferred. These may be used for the three coupled two-level-system model describing the qubit-coupler-qubit system 100 which is on the bare transition frequency of the qubits 111, 121 and the bare transition frequency of the coupler 131.

The calibration of a single transmon qubit 400 may include the calibration of three inputs. The first is the Z control line, as discussed above. The second input is an XY control line for microwave control of the state of the qubit 400, for example, to achieve $\pi$ and $\pi/2$ pulses which lead to the controlled rotation of the qubit state and to perform Rabi oscillations of the qubit 400. Gate operations on qubits 110, 120, 400 may involve a combination of one or more of Z control signals and one or more of XY control signals. The third input is the readout line through the interface circuitry 420, mentioned above. However, this specification will focus on the aspect of resonance frequency control and the initialization of the qubits 110, 120, 400 and the second input, the XY control line and the third input, the readout line, will be assumed to have been calibrated before or be calibrated concurrently with the procedure described in FIGS. 2 and 3.

Figure 5B:
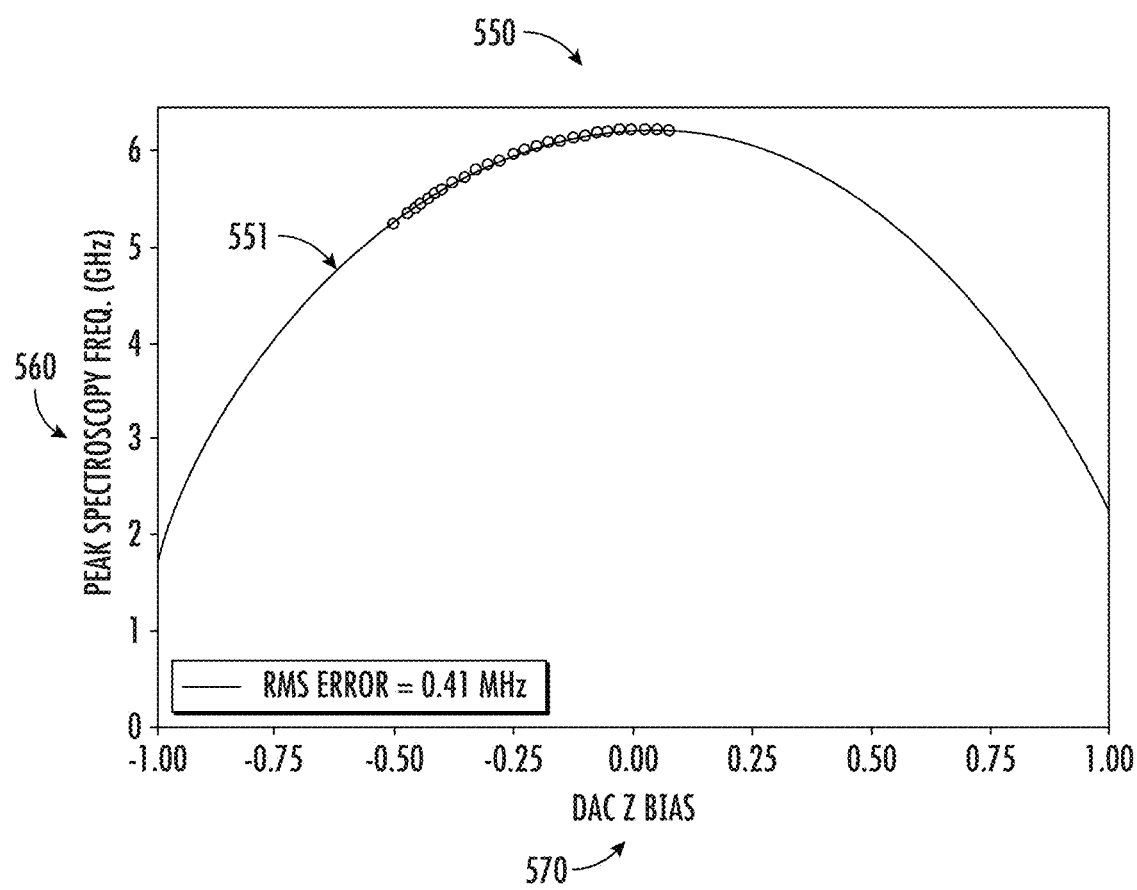
FIG. 5b shows a measurement data of the resonance frequency of a transmon qubit as a function of the flux bias applied to the transmon qubit.

FIG. 5b shows a measurement data of the resonance frequency of a transmon qubit as a function of the flux bias applied to the transmon qubit.

A second graph 550 shows a measurement of the resonance frequency of the transmon qubit 400 coupled to the readout resonator 410, which acts as, for example, the first qubit 110 of the qubit-coupler-qubit system 100. Similar measurement can be repeated for the transmon qubit 400 which acts as the second qubit 120 of the qubit-coupler-qubit system 100.

The resonance frequency of the transmon qubit 400, represented in a vertical axis 560, is measured as the first bias 112, the magnetic flux applied by the Z control line into the SQUID loop 402, represented in a horizontal axis 570, labelled as 'DAC Z Bias', is changed.

Also as part of steps 210 and 220, this measurement maps the DAC voltage in the horizontal axis 570 to the frequency of the qubit 400. At each value of the first bias 112, qubit spectroscopy is performed via the XY control line to identify the resonance frequency of the qubit 400. The first bias 112, the flux bias to the transmon qubit 400 applied by the Z control line, is represented in the horizontal axis 570. The resonance frequency of the transmon qubit 400 is represented in the vertical axis 560, labelled as 'Peak Spectroscopy Freq. (GHz).'

In some implementations, at each value of the first bias 112, the flux bias to the transmon qubit 400 applied by the Z control line, represented in the horizontal axis 570, the XY control line connected to the transmon qubit 400 is driven with a microwave pulse which is fixed at the desired or the target first transition frequency 111 known from the design, or inferred from the measurements shown in FIG. 5a. Multiple pulses are sent to the qubit 400 via the XY control line with variable amplitude. When the first bias 112 places the qubit 400 on resonance, the qubit 400 undergoes Rabi oscillations, cycling between 0 and 1 states as the amplitude of the XY control pulse increases. From these oscillations at each amplitude, the resonance frequency of the qubit 400 can be identified. This can be detected with the readout line of the interface circuitry 420. This measurement can be repeated by varying the frequency of the XY control pulses.

In some implementations, when the first transition frequency 111 is known for at least one value of the first bias 112, the measurement may be made adaptively, namely by changing the first bias 112 and scanning the frequency range of the XY control pulses within a reasonable range such that the full possible frequency range does not have to be scanned with the XY control pulse and the Z control signal, or the first bias 112. For example, the measurements in the second graph 550 may be performed near the idle bias, which corresponds to a desired initialized frequency of the first qubit 110. The idle bias of the transmon qubit 400 may be determined to be near the flux insensitive point.

The measurements shown in the second graph 550 provides the measurement of the maximum frequency of the qubit 400, which may be more accurate from the maximum frequency obtained from the measurements in FIG. 5*a*. Therefore, the first model, or single qubit model for the measurements in the second graph 550 may include the formula $$f_{Qubit}(\varphi) = f_{max}\sqrt{\cos\left(\frac{\pi\varphi}{\varphi_0}\right)}$$

which was presented above and represented as a curve 551 in FIG. 5*b*. In some implementations, the flux offset and the mutual inductance, explained in FIG. 5*a*, may be included in this formula as free parameters.

In the second graph 550, the measurement data points, represented as dots, are fitted to the curve 551 to evaluate the maximum frequency of the qubit 400.

FIG. 6 shows the resonance frequency of a transmon qubit as a function of the flux bias applied to a coupler.

A first graph 600 shows the resonance frequency of the transmon qubit 400, which acts as, for example, the first qubit 110 of the qubit-coupler-qubit system 100. Similar measurement can be repeated for the transmon qubit 400 which acts as the second qubit 120 of the qubit-coupler-qubit system 100.

As mentioned above for steps 230 and 240, when the measurements shown in FIG. 6 is performed on the first qubit 110 and the coupler 130, the second qubit 120 may be shifted away from the relevant frequency range for the first qubit 110, namely the resonance frequency of the transmon qubit 400 and the readout resonator 410 such that the second qubit 120 is not coupled to either the first qubit 110 or the coupler 130.

As part of steps 230 and 240, the resonance frequency of the transmon qubit 400 is measured as the third bias 132 applied to the coupler 130 is changed. For example, the third bias 132 can be a magnetic flux applied by the Z control line into the SQUID loop of the coupler 130 when the coupler 130 is a superconducting qubit. For example, the coupler 130 may be a transmon qubit 400.

The third bias 132 is represented in a horizontal axis 620, labelled as 'Bias [V].' As the third bias 132 is varied from about −0.65V to 0.35V, the frequency of the probing signal, labelled as 'Frequency [arb.]', represented in a vertical axis 610 in an arbitrary unit, is also varied.

As discussed above, the probing signal, generated by the driving electronics of the interface circuitry 420 is reflected from the readout resonator 410 and couples back into the interface circuitry 420 to be detected by the detection electronics. The lines in the first graph 600 corresponds to a resonance frequency or an eigenmode of the qubit-coupler system, which corresponds to a hybridized mode or a mixed state of a coupled two-level system model of the qubit-coupler system.

As the third bias 132 is changed, the first transition frequency 111 changes because the first qubit 110 and the coupler 130 are coupled to each other via the first part of the first degree of coupling 140-1. As shown in FIG. 5*a*, since the transmon qubit 400 and the readout resonator 410 are strongly coupled, the resonance frequency of the readout resonator 410 of the first qubit 110 shifts accordingly.

The first graph 600 shows three segments of measured traces, which are separated by a first line 601 and a second line 602, namely one on the left hand side of the first line 601, one between the first line 601 and one on the right hand side of the second line 602. Two of the segments are tangential to the first line 601 representing a value of the third bias 132, or the flux applied to the coupler 130, around −0.6V. Two of the segments are tangential to the second line 602 representing a value of the third bias 132 around 0.3V. The segment shown in the middle is tangential to both the first line 601 and the second line 602. The "avoided crossing" behavior, discussed above in FIG. 5*a* is shown around the first line 601 and the second line 602, which suggests that the first qubit 110 or the transmon qubit 400 and the coupler 130 are strongly coupled. A degree of the separation between the two segments of the measurement curves on either side of the first line 501 and the second line 502 relate to the coupling efficiency between the first qubit 110 and the coupler 130.

Since this behavior can be described by the coupled two-level-systems model, in some implementations, the second model, or the qubit-coupler model for steps 230 and 240 may be formulated based on the coupled two-level systems model.

A third line 603, which is parallel to the vertical axis, represents a value of the third bias 132 around −0.15V. The third line 603 points to a point of the measurement trace where the resonance frequency curve is flat with respect to the change of the third bias 132. This point, corresponding to the maximum frequency of the qubit 400 or the flux insensitive point, may be offset from zero. Therefore, in some implementations, the second model, or the qubit-coupler model for steps 230, 240 may include the flux offset as a free parameter.

When the flat point occurs near the third line 603, the line tangential to the measurement trace points to corresponds to the maximum frequency of the transmon qubit 400 in the vertical axis 610. Therefore, in some implementations, the second model, or the qubit-coupler model for steps 230 and 240 may include the maximum frequency of the qubit 400 as a free parameter.

The horizontal axis 620 in FIG. 6 may represent DAC amplitude for the third bias 132 or the coupler bias. When the coupler 130 is a transmon qubit, the Z control line configured to generate magnetic flux for the third bias 132, may include a current source, controlled by the DAC voltage and a transducer to generate magnetic flux from the current generated by the current source. Therefore, the DAC amplitude in the horizontal axis 620 is in general proportional to the magnetic flux threaded through the SQUID loop of the coupler 130 or the coupler qubit. However, the conversion of the DAC amplitude and the physical units of the actual magnetic flux may depend on various factors, such as the mutual inductance between the Z control line and the SQUID loop 420 of the coupler qubit 130, 400. Therefore, in some implementations, the second model, or the qubit-coupler model for steps 230 and 240 may include the mutual inductance between the coupler qubit 130 and the Z control line as a free parameter.

Steps 230 and 240 are performed by taking measurements of the resonance frequency of the first qubit 110, 400 as a function of the third bias 132 applied to the coupler 130 and fitting the data to the second model.

In some implementations, the second model, or the qubit-coupler model is formulated based on the coupled two-level-system model and may include the flux offset or the flux insensitive point, the mutual inductance between the coupler and the Z control line coupled to the coupler 130, the maximum frequency of the first qubit 110, 400, and the coupling efficiency between the first qubit 110 and the coupler 130. In particular the coupling efficiency between the first qubit 110 and the coupler 130 corresponds to the first part of the first degree of coupling 140-1. If the same measurements are repeated between the second qubit 110 and the coupler 130, the coupling efficiency included in the second model corresponds to the second part of the first degree of coupling 140-2.

The second model may include more free parameters depending on the design of the qubit 400 or the experimental settings, such as the interface circuitry 420. Also, some of the parameters above may be removed from the second model if the value of that parameter can be identified a priori with sufficient accuracy.

Steps 230 and 240, the measurements and the fitting in the first graph 600 may be repeated for the second qubit 120 and the coupler 130. Such measurements may provide, among others, the second part of the first degree of coupling 140-2.

The first graph 600 also shows a result of fitting the data to the second model. The second model fitted to the data is shown as a solid line.

In some implementations, when the qubit-coupler-qubit system 100 is symmetrical in the sense that the first qubit 110 and the second qubit 120 are identical or the first part of the first degree of coupling 140-1 and the second part of the second degree of coupling 140-2 is identical, the steps 230 and 240 may be performed only on either with the first qubit 110 and the coupler 130 or with the second qubit 120 and the coupler 130.

In some implementations, the steps 230 and 240 may be performed at multiple frequencies of the first qubit 110 or the second qubit 120 to improve accuracy in evaluation of the fitted parameters.

Figure 7:
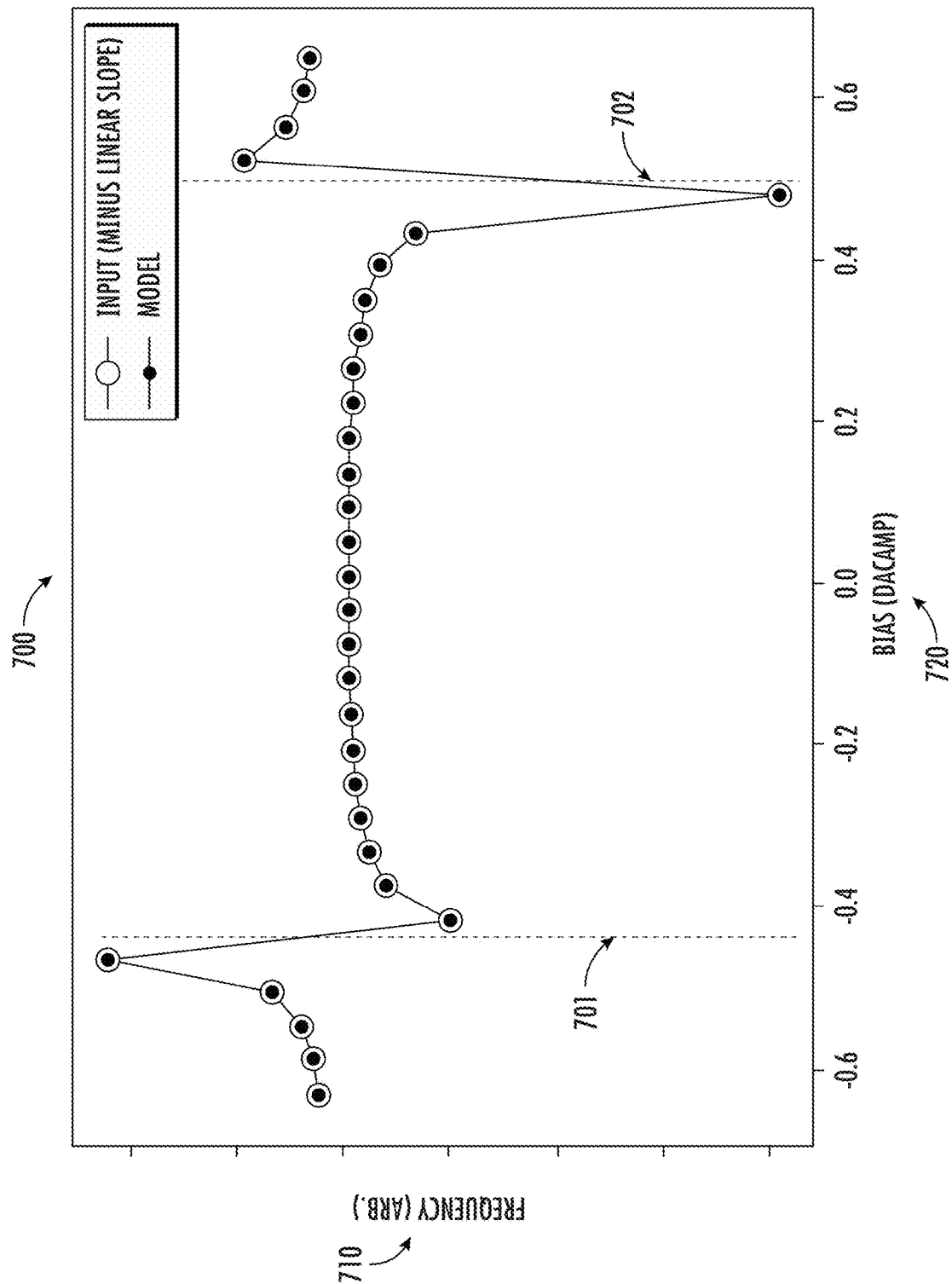
FIG. 7 shows the resonance frequency of a first transmon qubit as a function of the flux bias applied to a second transmon qubit

FIG. 7 shows the resonance frequency of a first transmon qubit as a function of the flux bias applied to a second transmon qubit.

A first graph 700 shows the resonance frequency of the transmon qubit 400, which acts as, for example, the first qubit 110 of the qubit-coupler-qubit system 100. In particular, the resonance frequency corresponds to an eigenmode of the qubit-qubit system, or a hybridized mode or a mixed state of a coupled two-level system model of the qubit-qubit system. Similar measurement can be repeated for the readout resonator 410 of the transmon qubit 400 which acts as the second qubit 120 of the qubit-coupler-qubit system 100.

As part of steps 250 and 260, the resonance frequency of the transmon qubit 400 is measured as the second bias 122 applied to the second qubit 120 is changed. For example, the second bias 122 can be a magnetic flux applied by the Z control line into the SQUID loop of the second qubit 120.

In the first graph 700, for example, the coupler 130 may be a transmon qubit 400 and set at the maximum frequency. However, in order to measure the coupling between the first qubit 110 and the second qubit 120, the coupler qubit 130 does not necessarily have to be set at the maximum frequency. For example, if the minimum frequency of the coupler qubit 130 is known, the third bias 132 may be set such that the coupler qubit 130 is sent near the minimum frequency.

The second bias 122 is represented in a horizontal axis 720, labelled as 'bias (dacamp)' As the third bias 132 is varied from about −0.65V to 0.65V, the delay in the Ramsey fringe measurement related to 'Ramsey qubit frequency [arb.]' in a vertical axis 710, is also varied. In order to measure the first transition frequency 111, Ramsey fringe measurements may be made.

In Ramsey fringe measurements, the first qubit 110 or the transmon qubit 400 is prepared along the x-axis of the Block sphere by applying a $\pi/2$ pulse using the X control line. After a time delay, a second $\pi/2$ pulse is applied to the transmon qubit 400 using the X control line. If the frequency of the $\pi/2$ pulse, known and controllable a priori, coincides with the transition frequency of the transmon qubit 400, or the first transition frequency 111, the measured qubit state after the second $\pi/2$ pulse is '1' state or the excited state regardless of the delay, on the assumption that the coherence time of the transmon qubit 400 is much longer than the longest delay used for the Ramsey measurement. However, when the frequency of the $\pi/2$ pulse does not match the first transition frequency 111, the measured qubit state after the second $\pi/2$ pulse appears to precess at a frequency which corresponds to the difference between the frequency of the $\pi/2$ pulse and the first transition frequency 111.

From the precession frequency of along the vertical line of measured data at each value of the second bias 122 and the known frequency of the $\pi/2$ pulse used for the Ramsey measurement, the first transition frequency 111 of the first qubit 110 or the transmon qubit 400 can be evaluated by taking the difference.

An alternative method of measuring the qubit transition frequency 111, 121 was presented in FIG. 5b, namely the qubit spectroscopy. Ramsey measurements may facilitate the measurements of the qubit transition frequency 111, 121 with a higher accuracy than the qubit spectroscopy. However, in some implementations, the first transition frequency 111 may be obtained with the qubit spectroscopy as discussed in FIG. 5b.

The first graph 700 shows the first transition frequency 111 evaluated using the Ramsey measurements as dots. A vertical axis 710 of the first graph 700, labelled as 'Ramsey qubit frequency [arb.]' represents the first transition frequency 111 in arbitrary unit.

As the second bias 122 is changed, the first transition frequency 111 changes because the first qubit 110 and the second qubit 120 are coupled to each other via the second degree of coupling 150. The first graph 700 shows that the coupling between the first qubit 110 and the second qubit 120 show "avoided crossing" behavior around a first line 701 and a second line 702. This suggests that the first qubit 110 and the second qubit 120 are strongly coupled.

Since this behavior can be described by the coupled two-level-systems model, in some implementations, the third model, or the qubit-qubit model for steps 250 and 260 may be formulated based on the coupled two-level systems model.

In some implementations, the third model, or the qubit-qubit model for steps 250, 260 may include the coupling efficiency between the first qubit 110 and the second qubit 120 as a free parameter.

In some implementations, the third model, or the qubit-qubit model for steps 250, 260 may include the flux offset as a free parameter.

In some implementations, the third model, or the qubit-qubit model for steps 250, 260 may include the maximum frequency of the first qubit 110 as a free parameter.

The horizontal axis 720 of the first graph 700 in FIG. 7 may represent DAC amplitude for the second bias 122. The Z control line configured to generate magnetic flux for the second bias 122 may include a current source, controlled by the DAC voltage and a transducer to generate magnetic flux from the current generated by the current source. Therefore, the DAC amplitude in the horizontal axis 720 of the first graph 700 is in general proportional to the magnetic flux threaded through the SQUID loop of the second qubit 120. However, the conversion of the DAC amplitude and the physical units of the actual magnetic flux may depend on various factors, such as the mutual inductance between the Z control line and the SQUID loop 420 of the second qubit 120. Therefore, in some implementations, the third model, or the qubit-qubit model for steps 250 and 260 may include the mutual inductance between the second qubit 120 and the Z control line as a free parameter.

Steps 250 and 260 are performed by taking measurements of the resonance frequency of the first qubit 110 as a function of the second bias 122 and fitting the data to the third model, or the qubit-qubit model.

In some implementations, the third model, or the qubit-qubit model is formulated based on the coupled two-level-system model and may include the flux offset or the flux insensitive point, the mutual inductance between the second qubit 120 and the Z control line coupled to the second qubit 120, the maximum frequency of the first qubit 110, 400, and the coupling efficiency between the first qubit 110 and the second qubit 120. In particular the coupling efficiency between the first qubit 110 and the second qubit 120 corresponds to the second degree of coupling 150.

The second model may include more free parameters depending on the design of the qubit 400 or the experimental settings, such as the interface circuitry 420. Also, some of the parameters above may be removed from the second model if the value of that parameter can be identified a priori with sufficient accuracy or evaluated in previous steps 210 to 240.

Steps 250 and 260 or the measurements and the fitting in the first graph 700 may be repeated by varying the first bias 112 and measuring the second transition frequency 121 of the second qubit 120. This may lead to more accurate measurement of the second degree of coupling.

The first graph 700 shows a result of fitting the data shown as dots to the third model. The second model fitted to the data is shown as a solid line on the first graph 700.

In some implementations, the steps 250 and 260 may be performed at multiple frequencies of the first qubit 110 to improve accuracy in evaluation of the fitted parameters.

As discussed in FIG. 3, once the qubit-coupler-qubit system 100 is calibrated as discussed above (step 310), the qubit-coupler-qubit system 100 may be initialized.

For gate operations or measurements required for performing algorithms or computations, the transition frequencies 111, 121 of the first qubit 110 and the second qubit 120 may be dynamically shifted by adjusting the first bias 112 and the second bias 122. However, initially, the qubits 110, 120 may be set at their respective initial frequencies 111, 121 or idle frequencies 111', 121' and such that the coupling between the qubits 140-1, 140-2, 150 is minimized.

For given desired initial transition frequencies 111, 121 or for a first idle frequency 111' for the first qubit 110 and the second idle frequency 121' for the second qubit 120, the third bias 132 at which the coupling between the first qubit 110 and the second qubit 120 is minimized or suppressed.

In steps 230 and 240 and FIG. 6, the first part of the first degree of coupling 140-1 and the second part of the first degree of coupling 140-2 was evaluated. This corresponds to an indirect coupling mediated by the coupler 130.

In steps 250 and 260 and FIG. 7, the second degree of coupling 150 was evaluated. This corresponds to a direct coupling between the first qubit 110 and the second qubit 120. In some implementations, when the first qubit 110 and the second qubit 120 are transmon qubits 400, the direct coupling or the second degree of coupling 150 may be capacitive coupling between the LC oscillators which form the transmon qubits 400.

The overall coupling or the net coupling between the first qubit 110 and the second qubit 120 may be decomposed into an even (symmetric) mode and an odd (antisymmetric) mode. When the first idle frequency 111' and the second idle frequency 121' are equal, the first degree of coupling 140-1, 140-2 mediated by the coupler 130 affects the even mode and the second degree of coupling 150, direct coupling between the first qubit 110 and the second qubit 120 affects the odd mode. Since the direct coupling the net coupling corresponds to half the difference between the even mode and the odd mode, in some implementations, the third bias 132 may be set such that the direct coupling 150 and the indirect coupling 140-1, 140-2 cancel each other. For example, the third transition frequency 131 of the coupler may be set to be higher than the first transition frequency 111 and the second transition frequency 121.

In some implementations, the first degree of coupling 140 can be evaluated based on the second degree of coupling 150 and by measuring the net coupling between the first qubit 110 and the second qubit 120.

In order to evaluate the third bias 132 at which the net coupling is minimized or suppressed such that the first qubit 110 and the second qubit 120 are decoupled (step 330), a three coupled two-level-systems model can be made for the qubit-coupler-qubit system 100. In formulating a Hamiltonian for the three coupled two-level-systems model, the first qubit 110, the second qubit 120 and the coupler 130 will be labelled as a, b, c, respectively for notation. For example, the bare transition frequencies 111, 121, 131 will be noted as $f_a$, $f_b$, $f_c$, respectively, and the coupling rate between the second qubit 120 and the coupler 130 will be noted as $g_{bc}$. The Hamiltonian in the single-excitation subspace in the rotating frame is given by $$\mathcal{H} = \begin{pmatrix} f_a & g_{ab} & g_{ac} \\ g_{ab} & f_b & g_{bc} \\ g_{ac} & g_{bc} & f_c \end{pmatrix}$$

$f_a$ and $f_b$ are bare transition frequencies 111, 121 of the first qubit 110 and the second qubit 120, respectively evaluated in steps 210 and 220 or in FIGS. 4a and 4b. As discussed above, a bare transition frequency of a transmon qubit correspond to the transition frequency when it is decoupled from its readout resonator. This is evaluated in steps 210 and 220 or in FIGS. 5a and 5b.

$f_c$ is a third transition frequency 131 of the coupler 130.

$g_{ac}$, the coupling rate between the first qubit 110 and the coupler 130, corresponds to the first part of the first degree of coupling 140-1, evaluated in steps 230 and 240 or in FIG. 6.

$g_{bc}$, the coupling rate between the second qubit 120 and the coupler 130, corresponds to the second part of the first degree of coupling 140-2, evaluated in steps 230 and 240 or in FIG. 6.

$g_{ab}$, the coupling rate between the first qubit 110 and the second qubit 120, corresponds to the second degree of coupling 150, evaluated in steps 250 and 260 or in FIG. 7.

In some implementations, the third bias 132 or the third transition frequency 131 at which the net coupling is minimized can be found by diagonalizing the matrix and equating the odd mode eigenvalue or eigenfrequency and the even mode eigenvalue or eigenfrequency.

For example, when the qubit bare frequencies are equal such that $f_a=f_b=f$ and the first part of the first degree of coupling 140-1 and the second part of the first degree of coupling 140-2 are equal such that $g_{ac}=g_{bc}=g_c$ the Hamiltonian can be diagonalized analytically without use of numerical evaluations as follows.

Since the coupling rate is proportional to the geometric mean of the resonance frequencies, the Hamiltonian can be rewritten as $$\mathcal{H} = \begin{pmatrix} f & k_q f/2 & k_c\sqrt{f\,f_c}/2 \\ k_q f/2 & f & k_c\sqrt{f\,f_c}/2 \\ k_c\sqrt{f\,f_c}/2 & k_c\sqrt{f\,f_c}/2 & f_c \end{pmatrix}$$

The odd mode eigenfrequency and the even mode eigenfrequency are equated when $f_c = f(2-k_q)/(2-k_c^2/k_q)$.

Therefore, as a result of step S330, the third resonance frequency 131, $f_c$, can be obtained based on the first part of the first degree of coupling 140-1, the second part of the first degree of coupling 140-2 and the second degree of coupling 150.

In step 340, the third bias 132 can be set according to the third resonance frequency 131, $f_c$, obtained in step 330 to turn off the net coupling between the first qubit 110 and the second qubit 120.

Implementations of the subject matter and operations described in this specification can be implemented in suitable circuitry where input powers are low enough, operating temperatures are below the superconducting temperature of the device, and low loss and low insertion loss are required. Examples of such circuitry may include quantum computational systems, also referred to as quantum information processing systems, including the structures disclosed in this specification and their structural equivalents, or in combinations of one or more of them. The terms "quantum computational systems" and "quantum information processing systems" may include, but are not limited to, quantum computers, quantum cryptography systems, topological quantum computers, or quantum simulators.

The terms quantum information and quantum data refer to information or data that is carried by, held or stored in quantum systems, where the smallest non-trivial system is a qubit, e.g., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In some implementations the computational basis states are identified with the ground and first excited states, however it is understood that other setups where the computational states are identified with higher level excited states are possible. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Quantum circuit elements (also referred to as quantum computing circuit elements) include circuit elements for performing quantum processing operations. That is, the quantum circuit elements are configured to make use of quantum-mechanical phenomena, such as superposition and entanglement, to perform operations on data in a non-deterministic manner. Certain quantum circuit elements, such as qubits, can be configured to represent and operate on information in more than one state simultaneously. Examples of superconducting quantum circuit elements include circuit elements such as quantum LC oscillators, qubits (e.g., flux qubits, phase qubits, or charge qubits), and superconducting quantum interference devices (SQUIDs) (e.g., RF-SQUID or DC-SQUID), among others.

In contrast, classical circuit elements generally process data in a deterministic manner. Classical circuit elements can be configured to collectively carry out instructions of a computer program by performing basic arithmetical, logical, and/or input/output operations on data, in which the data is represented in analog or digital form. In some implementations, classical circuit elements can be used to transmit data to and/or receive data from the quantum circuit elements through electrical or electromagnetic connections. Examples of classical circuit elements include circuit elements based on CMOS circuitry, rapid single flux quantum (RSFQ) devices, reciprocal quantum logic (RQL) devices and ERSFQ devices, which are an energy-efficient version of RSFQ that does not use bias resistors.

Fabrication of the quantum circuit elements and classical circuit elements described herein can entail the deposition of one or more materials, such as superconductors, dielectrics and/or metals. Depending on the selected material, these materials can be deposited using deposition processes such as chemical vapor deposition, physical vapor deposition (e.g., evaporation or sputtering), or epitaxial techniques, among other deposition processes. Processes for fabricating circuit elements described herein can entail the removal of one or more materials from a device during fabrication. Depending on the material to be removed, the removal process can include, e.g., wet etching techniques, dry etching techniques, or lift-off processes. The materials forming the circuit elements described herein can be patterned using known lithographic techniques (e.g., photolithography or e-beam lithography).

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties. A superconductor (alternatively superconducting) material can be understood as material that exhibits superconducting properties at or below a superconducting critical temperature. Examples of superconducting material include aluminum (superconductive critical temperature of about 1.2 kelvin), indium (superconducting critical temperature of about 3.4 kelvin), NbTi (superconducting critical temperature of about 10 kelvin) and niobium (superconducting critical temperature of about 9.3 kelvin). Accordingly, superconducting structures, such as superconducting traces and superconducting ground planes, are formed from material that exhibits superconducting properties at or below a superconducting critical temperature.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For example, the actions recited in the claims can be performed in a different order and still achieve desirable results. In certain circumstances, multitasking and parallel processing may be advantageous. Moreover, the separation of various components in the implementations described above should not be understood as requiring such separation in all implementations.

A number of embodiments of the invention have been described. Nevertheless, it will be understood that various modifications may be made without departing from the spirit and scope of the invention. Accordingly, other embodiments are within the scope of the following claims. Quantum computing is usually formulated in terms of ideal two-level systems, called qubits. The two levels used in quantum computations are canonically denoted |0> and |1>, and are together called the computational states and said to form a computational subspace.

However, physical realizations of qubits often have additional states, known as non-computational states, which are said to form a non-computational subspace. These are often higher energy levels of the physical system being used as a qubit, such as the |2>, |3> etc. states. During the implementation of a quantum algorithm, leakage into these states from the computational states can be problematic and result in errors when executing the quantum algorithm. This leakage is, however, difficult to avoid, especially in weakly non-linear qubit systems, such as transmons. Moreover, non-computational states may be used in some implementations of quantum gates to execute a particular operation of the computational subspace. Leakage may occur during the execution of such quantum gates.

Minimizing leakage is an important design consideration when making an accurate quantum computer. However, tuning parameters of the quantum computer to minimize leakage requires that the population of non-computational states after executing an algorithm be known in order to determine the leakage. In practice, the populations of non-computational states are difficult to determine using readout apparatus that is used for measuring states in the computational subspace; often the readout apparatus, while capable of distinguishing between states in the computational subspace, cannot easily discriminate between a state in the non-computational subspace and a state in the computational subspace.

Instead of measuring the populations of the non-computational states directly, the systems and methods disclosed herein use readout apparatus that can only distinguish between a subset of the available states of the physical qubit, and apply shuffling sequences of control pulses to qubits in order to exchange the populations of states in the qubits before measurement. The readouts from the readout apparatus from these shuffled states can collectively be used to determine the populations of the states of the qubits.

What is claimed is:

1. A method for calibrating a system comprising:
   a first qubit, a second qubit, and a coupler coupled to the first qubit and the second qubit, the coupler configured to mediate a first degree of coupling between the first qubit and the second qubit,
   the method comprising:
   providing a first model for the first qubit and the second qubit, wherein the first model provides a first resonance frequency of the first qubit as a function of a first bias applied to the first qubit and provides a second resonance frequency of the second qubit as a function of a second bias applied to the second qubit;
   determining a first set of parameters of the first model such that the first model estimates the first resonance frequency in response to the first bias and the second resonance frequency in response to the second bias;
   providing a second model, wherein the second model provides the first resonance frequency and the second resonance frequency as a function of a third bias applied to the coupler;
   determining a second set of parameters of the second model such that the second model estimates the first resonance frequency and the second resonance frequency in response to the third bias;
   providing a third model, wherein the third model provides the first resonance frequency as a function of the second bias;
   determining a third set of parameters of the third model such that the third model estimates the first resonance frequency in response to the second bias and estimates a second degree of coupling between the first qubit and the second qubit in response to the first bias and the second bias, wherein the second degree of coupling is not mediated by the coupler; and
   providing a fourth model based on the second set and the third set of parameters, wherein the fourth model describes the system as a function of the first resonance frequency of the first qubit, the second resonance frequency of the second qubit and a third resonance frequency of the coupler.

2. The method of claim 1, wherein determining the first set of parameters comprises:
   generating a first data set by measuring the first resonance frequency at a plurality of values of the first bias and by measuring the second resonance frequency at a plurality of values of the second bias; and
   fitting the first model to the first data set.

3. The method of claim 1, wherein determining the second set of parameters comprises:
   providing the first bias at a first predetermined value and the second bias at a second predetermined value;
   generating a second data set by measuring the first resonance frequency and the second resonance frequency at a plurality of values of the third bias; and
   fitting the second model to the second data set to estimate the second set of parameters.

4. The method of claim 2, wherein determining the third set of parameters comprises:
provide the third bias at a third predetermined value;
providing the first bias at a fourth predetermined value;
generating a third data set by measuring the first resonance frequency at a plurality of values of the second bias; and
fitting the third model to the first data set to estimate the third set of parameters.

5. The method of claim 1, wherein the first set of parameters comprises one or more of: a first flux offset of the first qubit, a second flux offset of the second qubit, a first mutual inductance between the first qubit and a first coil for generating the first bias, a second mutual inductance between the second qubit and a second coil for generating the second bias, a first maximum frequency of the first qubit, a second maximum frequency of the second qubit, a first coupling efficiency between the first qubit and a first readout resonator and a second coupling efficiency between the second qubit and a second readout resonator.

6. The method of claim 1, wherein the second set of parameters further comprises one or more of: a third flux offset of the coupler, a third maximum frequency of the coupler, and a third mutual inductance between the coupler and a third coil for generating the third bias.

7. The method of claim 1, wherein the fourth model comprises a Hamiltonian for a three coupled two-level-systems.

8. The method of claim 1, wherein the coupler comprises an LC resonator, and an inductor of the LC resonator comprises a Josephson junction.

9. The method of claim 8, wherein the coupler comprises a gmon qubit.

10. The method of claim 8, wherein the coupler comprises a transmon qubit.

11. The method of claim 1, wherein the second degree of coupling comprises a capacitive coupling between the first qubit and the second qubit.

12. A method of initializing a system comprising:
a first qubit;
a second qubit; and
a coupler coupled to the first qubit and the second qubit, the method comprising:
providing a first resonance frequency of the first qubit and a second resonance frequency of the second qubit;
providing a first bias for the first-resonance frequency and a second bias for the second resonance frequency;
determining a value of a third resonance frequency such that a coupling mediated by the coupler and a direct coupling between the first qubit and the second qubit are in opposite directions; and,
applying a third bias to the coupler according to the determined value of the third resonance frequency to mediate a first degree of coupling between the first qubit and the second qubit;
wherein determining a value of the third resonance frequency comprising:
evaluating a first coupling coefficient between the first qubit and the coupler or between the second qubit and the coupler based on the first resonance frequency, the second resonance frequency, and the third resonance frequency; and
evaluating a second coupling coefficient associated with the direct coupling between the first qubit and the second qubit based on the first resonance frequency and the second resonance frequency.

13. The method of claim 12, wherein the method comprises:
evaluating, based on a second set of parameters, a first coupling coefficient $k_c$, wherein a coupling efficiency between the first qubit and the coupler or between the second qubit and the coupler is $$g_1 = k_C \frac{\sqrt{f f_c}}{2}$$

when the first resonance frequency or the second resonance frequency is f, and the third resonance frequency is $f_c$; and
evaluating, based on a third set of parameters, a second coupling coefficient $k_q$, wherein a second degree of coupling is $$g_2 = k_q \frac{\sqrt{f_1 f_2}}{2}$$

when the first resonance frequency is $f_1$ and the second resonance frequency is $f_2$.

14. The method of claim 13, wherein determining the value of the third resonance frequency comprises:
evaluating, from a Hamiltonian, an even mode eigenfrequency and an odd mode eigenfrequency of the system as a function of the first resonance frequency, the second resonance frequency and the third resonance frequency; and
equating the evaluated odd mode eigenfrequency and the evaluated even mode eigenfrequency to deduce the value of the third resonance frequency.

15. The method of claim 14,
wherein the value of the third resonance frequency is given by $$f_c = \frac{f(2 - k_q)}{2 - k_c^2/k_q}$$

when the first resonance frequency and the second resonance frequency are equal to f.

16. A system, comprising:
a first qubit;
a second qubit; and
a coupler coupled to the first qubit and the second qubit, the coupler configured to mediate a first degree of coupling between the first qubit and the second qubit;
wherein the system has been calibrated by:
providing a first model for the first qubit and the second qubit, wherein the first model provides a first resonance frequency of the first qubit as a function of a first bias applied to the first qubit and provides a second resonance frequency of the second qubit as a function of a second bias applied to the second qubit;
determining a first set of parameters of the first model such that the first model estimates the first resonance frequency in response to the first bias and the second resonance frequency in response to the second bias;
providing a second model, wherein the second model provides the first resonance frequency and the second resonance frequency as a function of a third bias applied to the coupler determining a second set of parameters of the second model such that the second model estimates the first resonance frequency and the second resonance frequency in response to the third bias providing a third model, wherein the third model provides the first resonance frequency as a function of the second bias;

determining a third set of parameters of the third model such that the third model estimates the first resonance frequency in response to the second bias and estimates a second degree of coupling between the first qubit and the second qubit in response to the first bias and the second bias, wherein the second degree of coupling is not mediated by the coupler; and providing a fourth model based on the second set and the third set of parameters, wherein the fourth model describes the system as a function of the first resonance frequency of the first qubit, the second resonance frequency of the second qubit and a third resonance frequency of the coupler.

17. The system of claim 16, wherein determining the first set of parameters comprises:

generating a first data set by measuring the first resonance frequency at a plurality of values of the first bias and by measuring the second resonance frequency at a plurality of values of the second bias; and fitting the first model to the first data set.

18. The system of claim 17, wherein determining the third set of parameters comprises:

providing the third bias at a third predetermined value;

providing the first bias at a fourth predetermined value;

generating a third data set by measuring the first resonance frequency at a plurality of values of the second bias; and fitting the third model to the first data set to estimate the third set of parameters.

19. The system of claim 16, wherein determining the second set of parameters comprises:

providing the first bias at a first predetermined value and the second bias at a second predetermined value;

generating a second data set by measuring the first resonance frequency and the second resonance frequency at a plurality of values of the third bias; and fitting the second model to the second data set to estimate the second set of parameters.

20. The system of claim 16, wherein the first set of parameters comprises one or more of: a first flux offset of the first qubit, a second flux offset of the second qubit, a first mutual inductance between the first qubit and a first coil for generating the first bias, a second mutual inductance between the second qubit and a second coil for generating the second bias, a first maximum frequency of the first qubit, a second maximum frequency of the second qubit, a first coupling efficiency between the first qubit and a first readout resonator and a second coupling efficiency between the second qubit and a second readout resonator.

* * * * *